US012423878B2

(12) United States Patent
Ding et al.

(10) Patent No.: US 12,423,878 B2
(45) Date of Patent: Sep. 23, 2025

(54) CONTENT-ADAPTIVE ONLINE TRAINING METHOD AND APPARATUS FOR DEBLOCKING IN BLOCK-WISE IMAGE COMPRESSION

(71) Applicant: Tencent America LLC, Palo Alto, CA (US)

(72) Inventors: Ding Ding, Palo Alto, CA (US); Wei Jiang, Sunnyvale, CA (US); Wei Wang, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 790 days.

(21) Appl. No.: 17/826,806

(22) Filed: May 27, 2022

(65) Prior Publication Data
US 2022/0405979 A1    Dec. 22, 2022

Related U.S. Application Data

(60) Provisional application No. 63/211,408, filed on Jun. 16, 2021.

(51) Int. Cl.
*H04N 19/44* (2014.01)
*G06N 3/08* (2023.01)
(Continued)

(52) U.S. Cl.
CPC ............... *G06T 9/002* (2013.01); *G06N 3/08* (2013.01); *H04N 19/44* (2014.11); *H04N 19/86* (2014.11)

(58) Field of Classification Search
CPC ........ G06T 9/002; H04N 19/44; H04N 19/86; G06N 3/08
(Continued)

(56) References Cited

U.S. PATENT DOCUMENTS

2021/0012537 A1   1/2021   Xu et al.
2021/0099710 A1   4/2021   Salehifar et al.
(Continued)

FOREIGN PATENT DOCUMENTS

WO       2019117646 A1    6/2019

OTHER PUBLICATIONS

Office Action received for Japanese Patent Application No. 2023-524439, mailed on May 13, 2024, 10 pages (5 pages of English Translation and 5 pages of Original Document).
(Continued)

*Primary Examiner* — Dominic D Saltarelli
(74) *Attorney, Agent, or Firm* — ArentFox Schiff LLP

(57) ABSTRACT

Aspects of the disclosure provide a method, an apparatus, and non-transitory computer-readable storage medium for video decoding. The apparatus includes processing circuitry that reconstructs blocks of an image that is to be reconstructed from a coded video bitstream. The processing circuitry decodes first deblocking information in the coded video bitstream including a first deblocking parameter of a deep neural network (DNN) in a video decoder. The first deblocking parameter of the DNN is an updated parameter that has been previously determined by a content adaptive training process. The processing circuitry determines the DNN for a first boundary region comprising a subset of samples in the reconstructed blocks based on the first deblocking parameter included in the first deblocking information. The processing circuitry deblocks the first boundary region comprising the subset of samples in the reconstructed blocks based on the determined DNN corresponding to the first deblocking parameter.

20 Claims, 22 Drawing Sheets

(51) Int. Cl.
*G06T 9/00* (2006.01)
*H04N 19/86* (2014.01)

(58) Field of Classification Search
USPC .......................................................... 375/240
See application file for complete search history.

(56) References Cited

U.S. PATENT DOCUMENTS

| | | | |
|---|---|---|---|
| 2021/0160522 | A1 | 5/2021 | Lee et al. |
| 2021/0295474 | A1* | 9/2021 | Wang ..................... G06N 3/084 |
| 2021/0409783 | A1 | 12/2021 | Wan et al. |
| 2022/0191483 | A1 | 6/2022 | Li et al. |

OTHER PUBLICATIONS

Yang et al., "Improved method of deblocking filter based on convolutional neural network in VVC", 2020 IEEE/CIC International Conference on Communications in China (ICCC), IEEE, 2020, pp. 764-769.
D. Minnen, J. Ballé, G. Toderici, "Joint Autoregressive and Hierarchical Priors for Learned Image Compression", Proceedings of the 32nd International Conference on Neural Information Processing Systems, Dec. 2018, pp. 1-22.
D. Liu, Z. Chen, S. Liu, F. Wu, "Deep Learning-Based Technology in Responses to the Joint Call for Proposals on Video Compression with Capability beyond HEVC", IEEE Transactions on Circuits and Systems for Video Technology, 2019, pp. 1-14.
Y. Li, S. Liu, K. Kawamura, "Methodology and reporting template for neural network coding tool testing", ISO/IEC JTC1/SC29/WG11 JVET-M1006, pp. 1-4.
S. Liu, L. Wang, p. Wu, H. Yang, "JVET AHG report 9: Neural Networks in Video Coding (AHG9)", ISO/IEC JTC1/SC29/WG11 JVET-J0009, pp. 1-3.
S. Liu, X. Zhang, S. Lei, "Rectangular partitioning for Intra prediction in HEVC", Visual Communications and Image Processing (VCIP), IEEE, Jan. 2012, pp. 1-6.
Ballé J, Minnen D, Singh S, et al. Variational image compression with a scale hyperprior[J]. arXiv preprint arXiv:1802.01436, 2018, pp. 1-23.
Toderici G, Vincent D, Johnston N, et al. "Full resolution image compression with recurrent neural networks", Proceedings of the IEEE Conference on Computer Vision and Pattern Recognition. 2017: 5306-5314.
Cheng Z, Sun H, Takeuchi M, et al. Learned image compression with discretized gaussian mixture likelihoods and attention modules, Proceedings of the IEEE/CVF Conference on Computer Vision and Pattern Recognition. 2020: 7939-7948.
Supplementary European Search Report issued Jul. 24, 2023 in Application No. 22797612.3.(10 pages).
Kee-Koo Kwon: "Adaptive postprocessing algorithm in block-coded images using block classification and MLP", IEICE Transactions on Fundamentals of Electronics, Communications and Computer Sciences, Engineering Sciences Society, Tokyo, JP, vol. E86-A, No. 4, Apr. 1, 2003, pp. 961-967.
Yat Hong Lam et al: "Compressing Weight-updates for Image Artifacts Removal Neural Networks", arxiv.org, Cornell University Library, 201 Olin Library Cornell University Ithaca, NY 14853, May 10, 2019.
Kee-Koo Kwon et al: "Deblocking Algorithm in Mpeg-4 Video Coding Using Block Boundary Characteristics and Adaptive Filtering", Image Processing, 2005. ICIP 2005. IEEE International Conference on, IEEE, Piscataway, NJ, USA, IEEE, vol. 3, Sep. 11, 2005, pp. 541-544.
International Search Report and Written Opinion issued Aug. 19, 2022 in Application No. PCT/US2022/072748.(9 pages).

\* cited by examiner

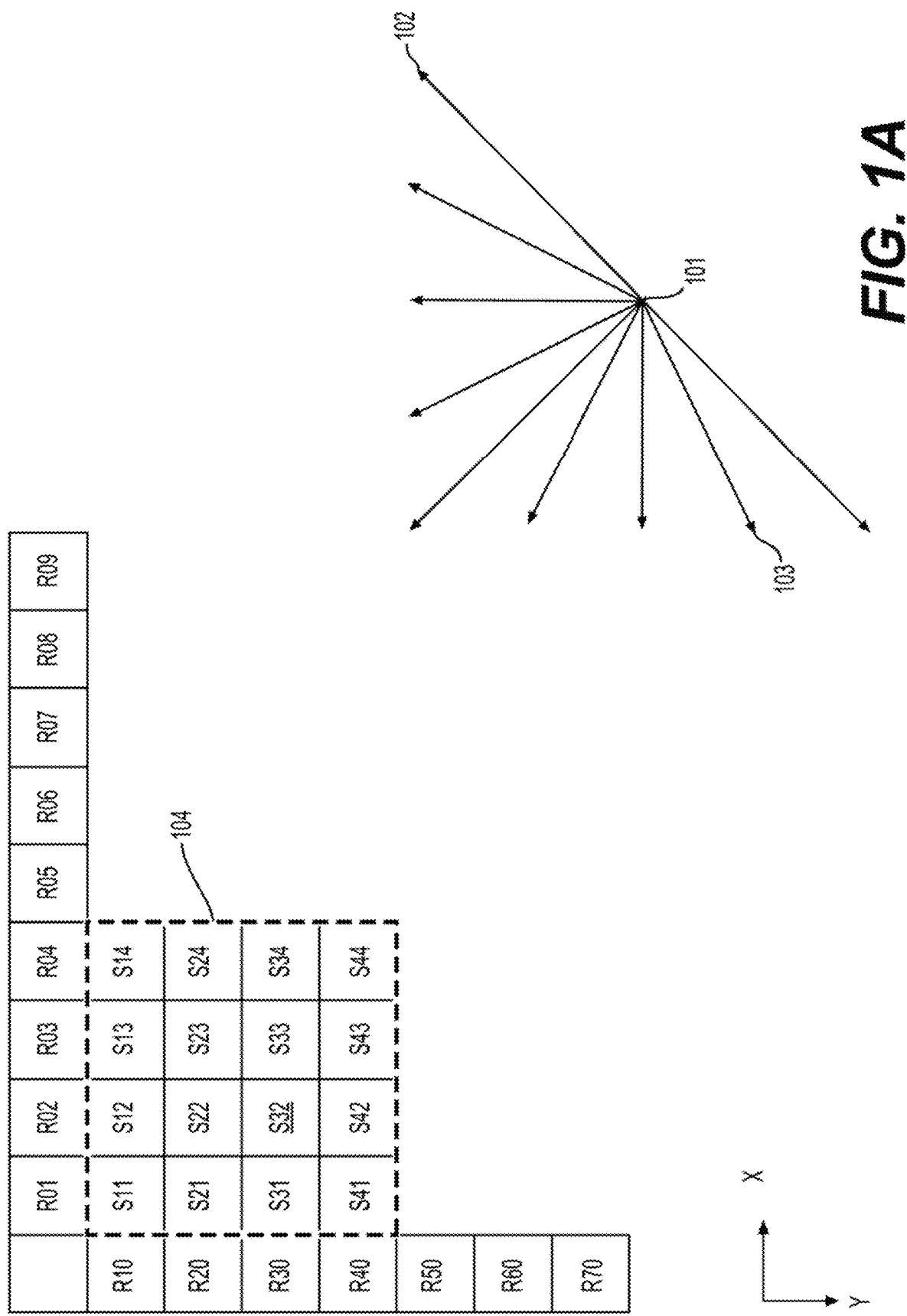

FIG. 10

Main encoder network

Conv: 5x5 c192 s2
GDN
Conv: 5x5 c192 s2
GDN
Conv: 5x5 c192 s2
GDN
Conv: 5x5 c192 s2

FIG. 11

Main decoder network

DeConv: 5x5 c192 s2
IGDN
DeConv: 5x5 c192 s2
IGDN
DeConv: 5x5 c192 s2
IGDN
DeConv: 5x5 c3 s2
IGDN

FIG. 12

Hyper encoder

Conv: 3x3 c192 s1
Leaky ReLU
Conv: 5x5 c192 s2
Leaky ReLU
Conv: 5x5 c192 s2

FIG. 13

Hyper decoder

DeConv: 5x5 c192 s2
Leaky ReLU
DeConv: 5x5 c288 s2
Leaky ReLU
DeConv: 3x3 c384 s1

FIG. 14

Context model NN

Masked: 5x5 c384 s1

FIG. 15

Entropy parameter NN

Conv: 1x1 c640 s1
Leaky ReLU
Conv: 1x1 c512 s1
Leaky ReLU
Conv: 1x1 c384 s1

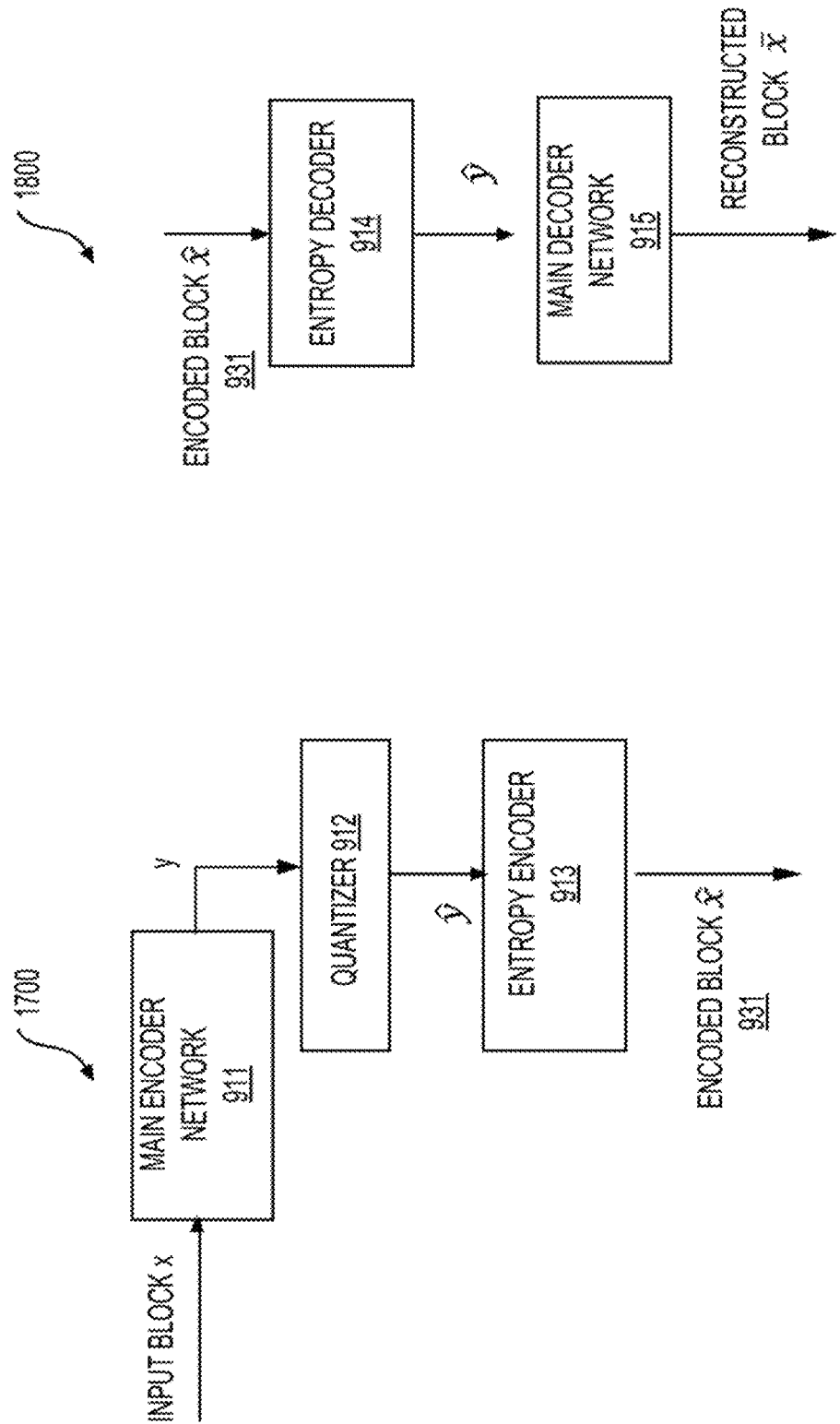

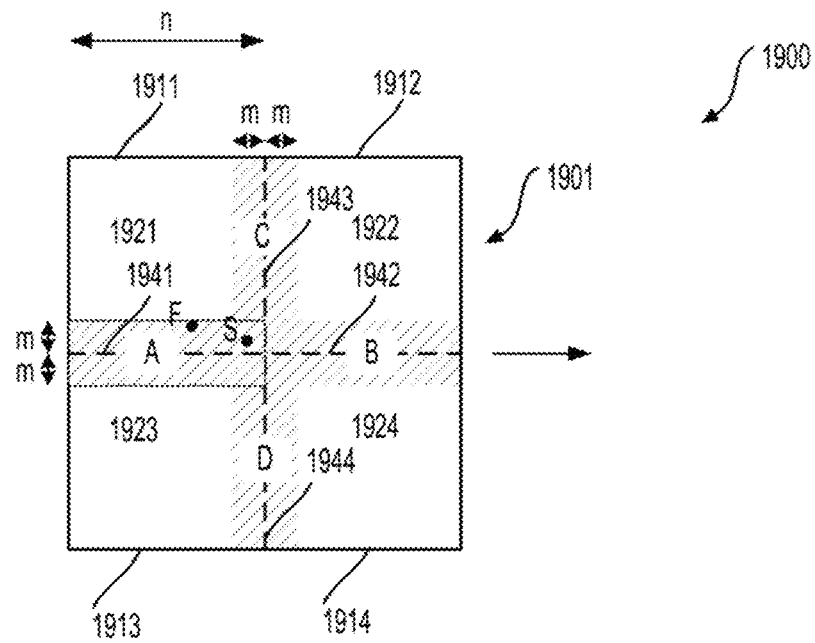
FIG. 19A
FIG. 19B
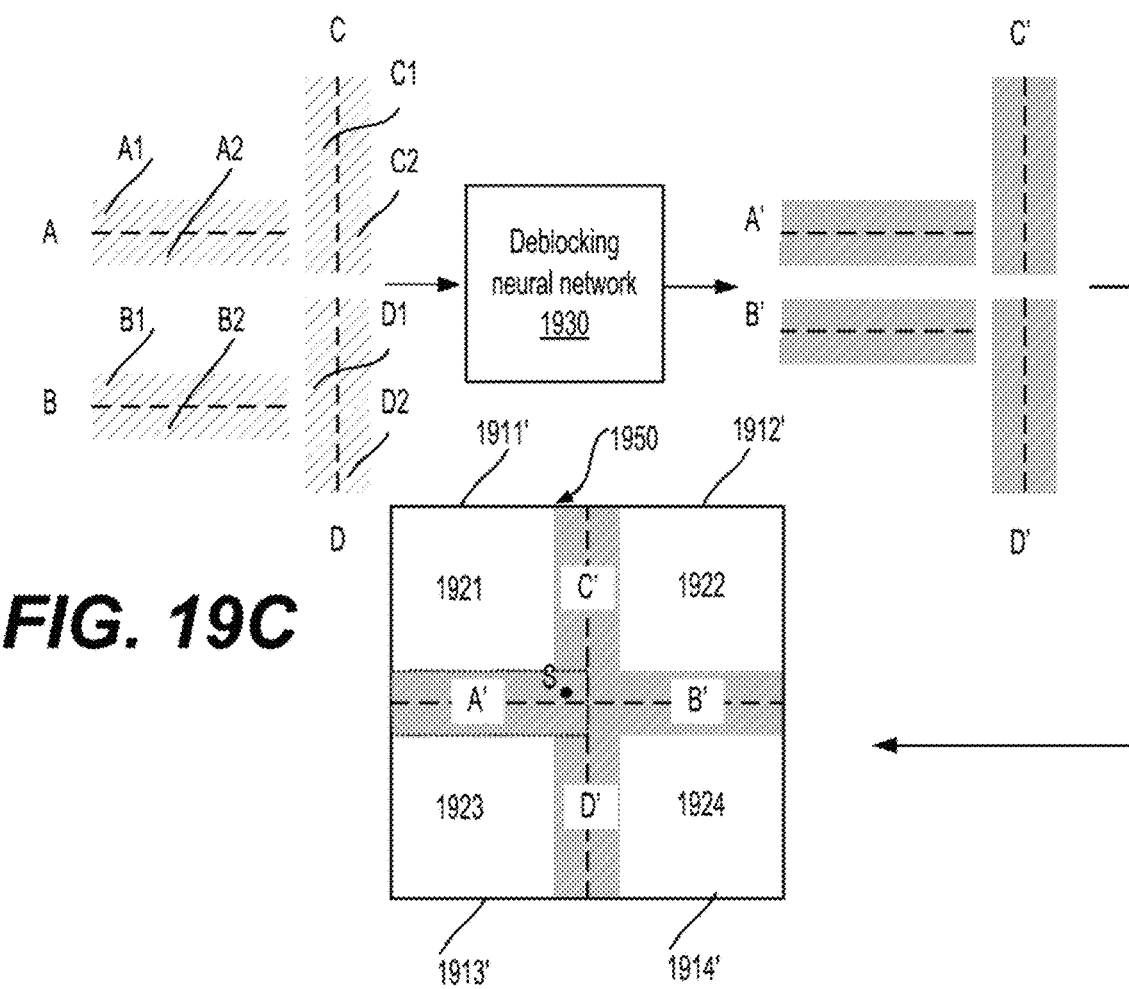
FIG. 19C

CONTENT-ADAPTIVE ONLINE TRAINING METHOD AND APPARATUS FOR DEBLOCKING IN BLOCK-WISE IMAGE COMPRESSION

INCORPORATION BY REFERENCE

This present disclosure claims the benefit of priority to U.S. Provisional Application No. 63/211,408, "Content Adaptive Online Training Deblocking for Block-Wise Image Compression" filed on Jun. 16, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image and/or video coding and decoding can be performed using inter-picture prediction with motion compensation. Uncompressed digital image and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to reconstruct blocks of an image that is to be reconstructed from a coded video bitstream. The processing circuitry can decode first deblocking information in the coded video bitstream including a first deblocking parameter of a deep neural network (DNN) in the video decoder. The first deblocking parameter of the DNN is an updated parameter that has been previously determined by a content adaptive training process. The processing circuitry can determine the DNN in the video decoder for a first boundary region comprising a subset of samples in the reconstructed blocks based on the first deblocking parameter included in the first deblocking information. The processing circuitry can deblock the first boundary region comprising the subset of samples in the reconstructed blocks based on the determined DNN corresponding to the first deblocking parameter.

In an embodiment, the reconstructed blocks include first neighboring reconstructed blocks that have a first shared boundary and include the first boundary region of samples on both sides of the first shared boundary. The first neighboring reconstructed blocks further include non-boundary regions that are outside the first boundary region. The first boundary region in the first neighboring reconstructed blocks is replaced with the deblocked first boundary region.

In an embodiment, the first deblocking parameter is a bias term or a weight coefficient in the DNN.

In an embodiment, the DNN is configured with initial parameters. The processing circuitry can update one of the initial parameters based on the first deblocking parameter.

In an embodiment, the first deblocking information indicates a difference between the first deblocking parameter and the one of the initial parameters. The processing circuitry can determine the first deblocking parameter according to a sum of the difference and the one of the initial parameters.

In an embodiment, the reconstructed blocks include second neighboring reconstructed blocks that have a second shared boundary and include a second boundary region of samples on both sides of the second shared boundary. The processing circuitry can decode second deblocking information in the coded video bitstream corresponding to the second boundary region. The second deblocking information indicates a second deblocking parameter that has been previously determined by a content adaptive training process. The second boundary region can be different from the first boundary region. The processing circuitry can update the DNN based on the first deblocking parameter and the second deblocking parameter. The updated DNN corresponds to the second boundary region and being configured with the first deblocking parameter and the second deblocking parameter. The processing circuitry can deblock the second boundary region based on the updated DNN corresponding to the second boundary region.

In an embodiment, the reconstructed blocks include second neighboring reconstructed blocks of the reconstructed blocks that have a second shared boundary and include a second boundary region having samples on both sides of the second shared boundary. The processing circuitry can deblock the second boundary region based on the determined DNN corresponding to the first boundary region.

In an embodiment, a number of layers of the DNN is dependent on a size of the first boundary region.

In an embodiment, the first boundary region further includes samples on both sides of a third shared boundary between third two neighboring reconstructed blocks included in the reconstructed blocks. The first two neighboring reconstructed blocks are different from the third two neighboring reconstructed blocks.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIG. 10 shows an exemplary convolution neural network (CNN) of a main encoder network according to an embodiment of the disclosure.

FIG. 11 shows an exemplary CNN of a main decoder network according to an embodiment of the disclosure.

FIG. 12 shows an exemplary CNN of a hyper encoder according to an embodiment of the disclosure.

FIG. 13 shows an exemplary CNN of a hyper decoder according to an embodiment of the disclosure.

FIG. 14 shows an exemplary CNN of a context model network according to an embodiment of the disclosure.

FIG. 15 shows an exemplary CNN of an entropy parameter network according to an embodiment of the disclosure.

FIG. 17 shows an exemplary video encoder according to an embodiment of the disclosure.

FIG. 18 shows an exemplary video decoder according to an embodiment of the disclosure.

FIGS. 19A-19C show an exemplary deblocking process according to an embodiment of the disclosure.

DETAILED DESCRIPTION OF EMBODIMENTS

Figure 1B:
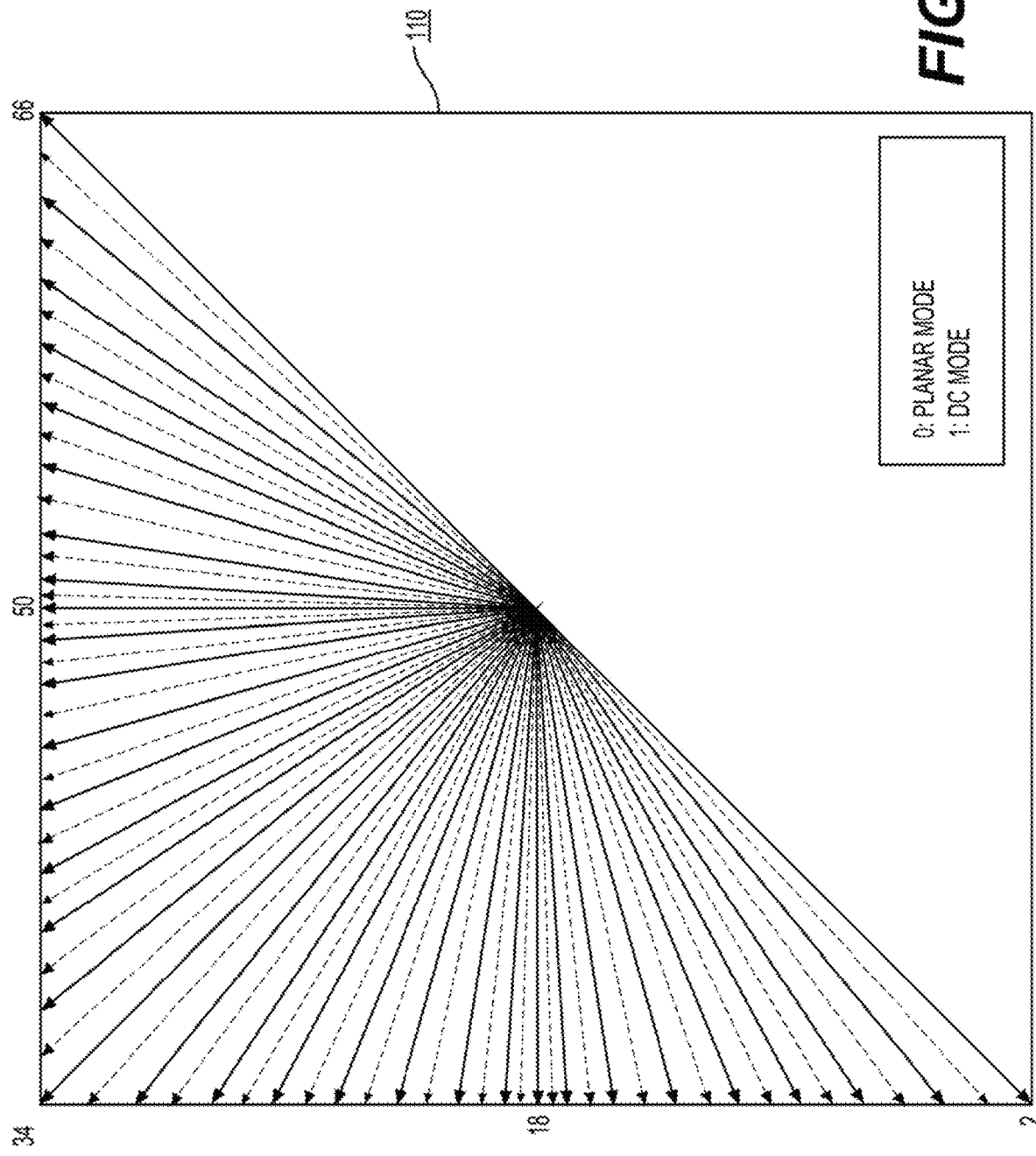
FIG. 1B is an illustration of exemplary intra prediction directions.
Figure 2:
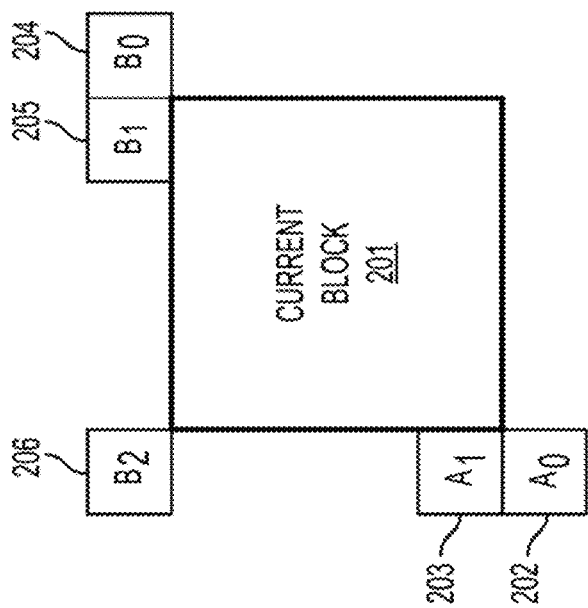
FIG. 2 shows a current block (201) and surrounding samples in accordance with an embodiment.
Figure 3:
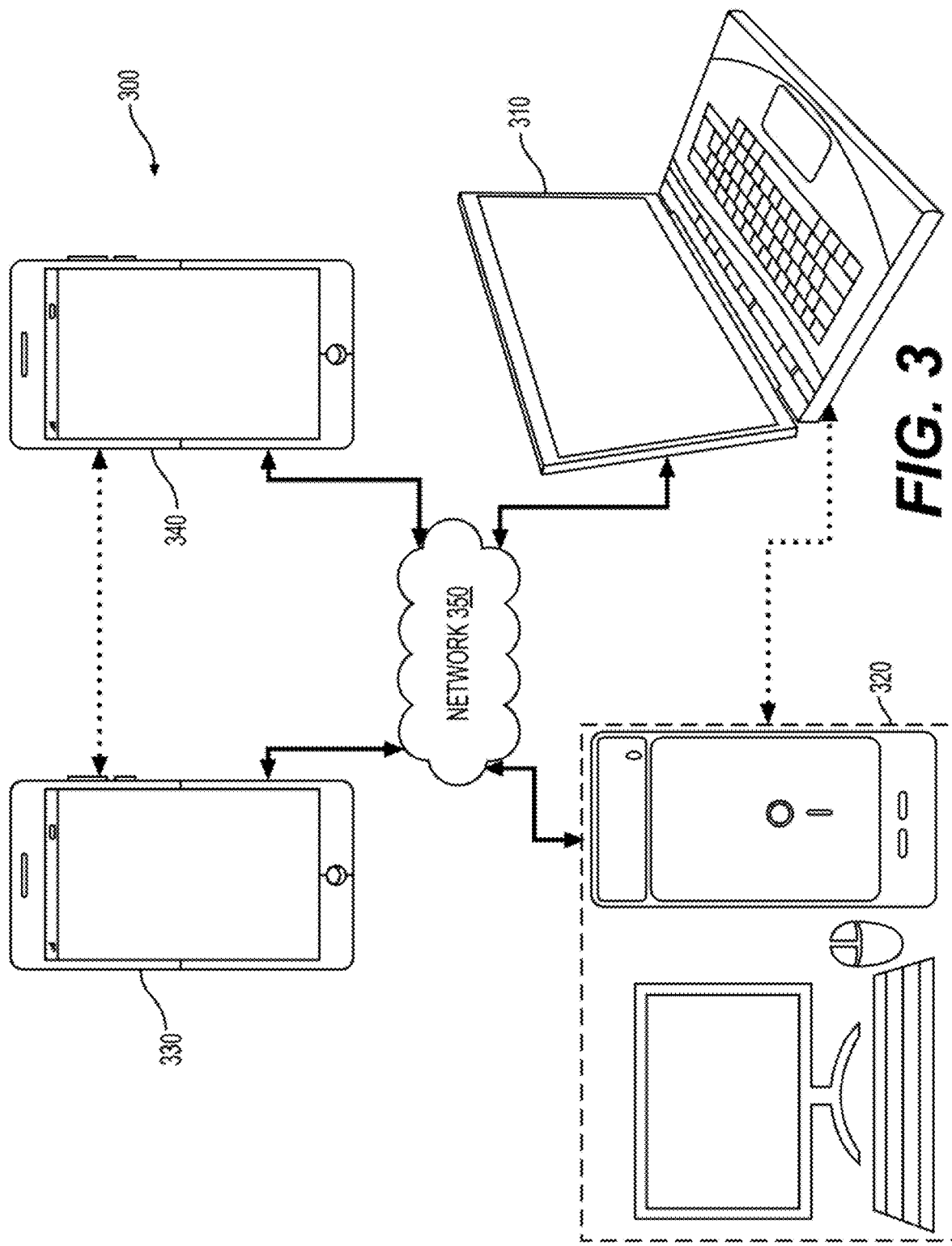
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
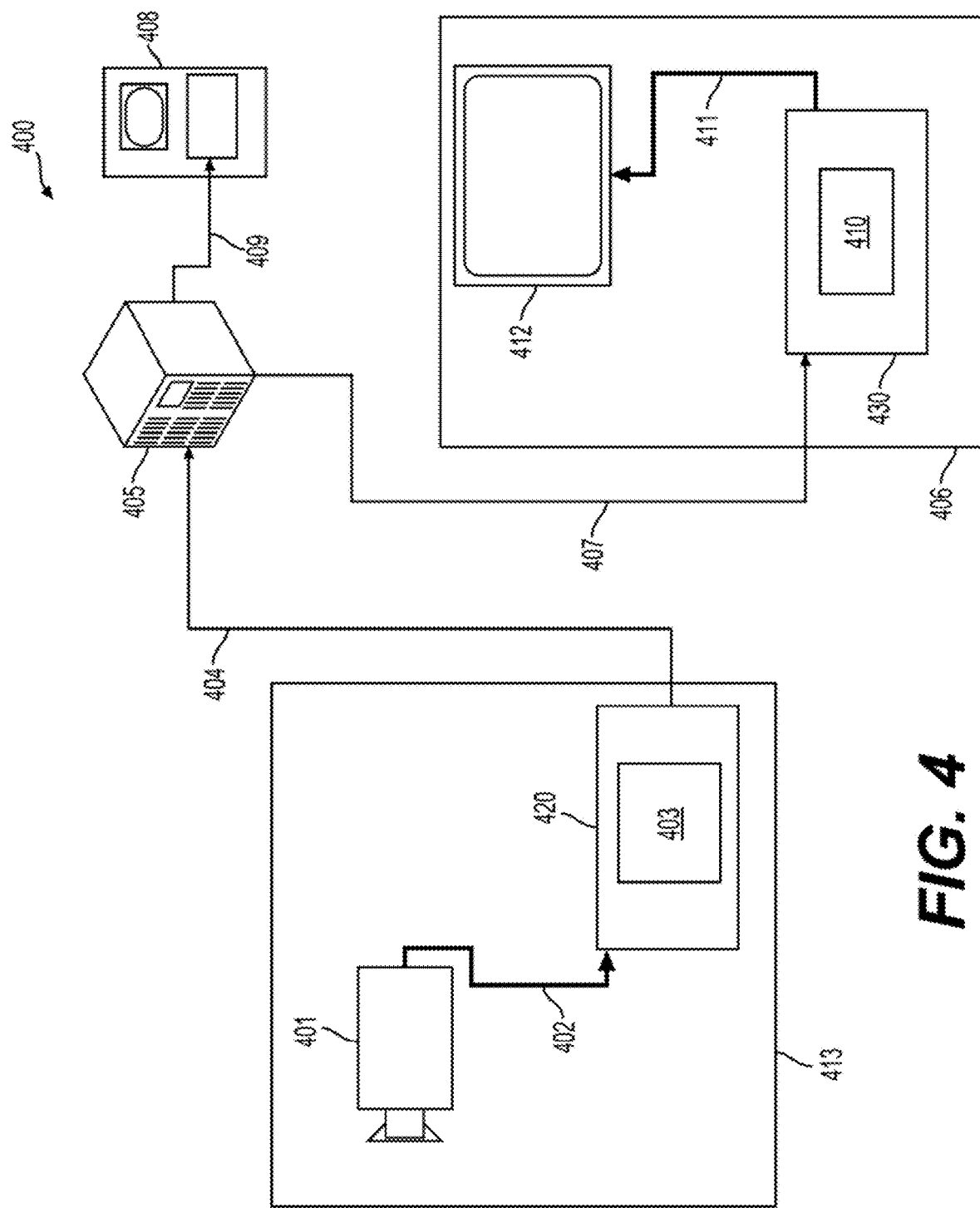
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
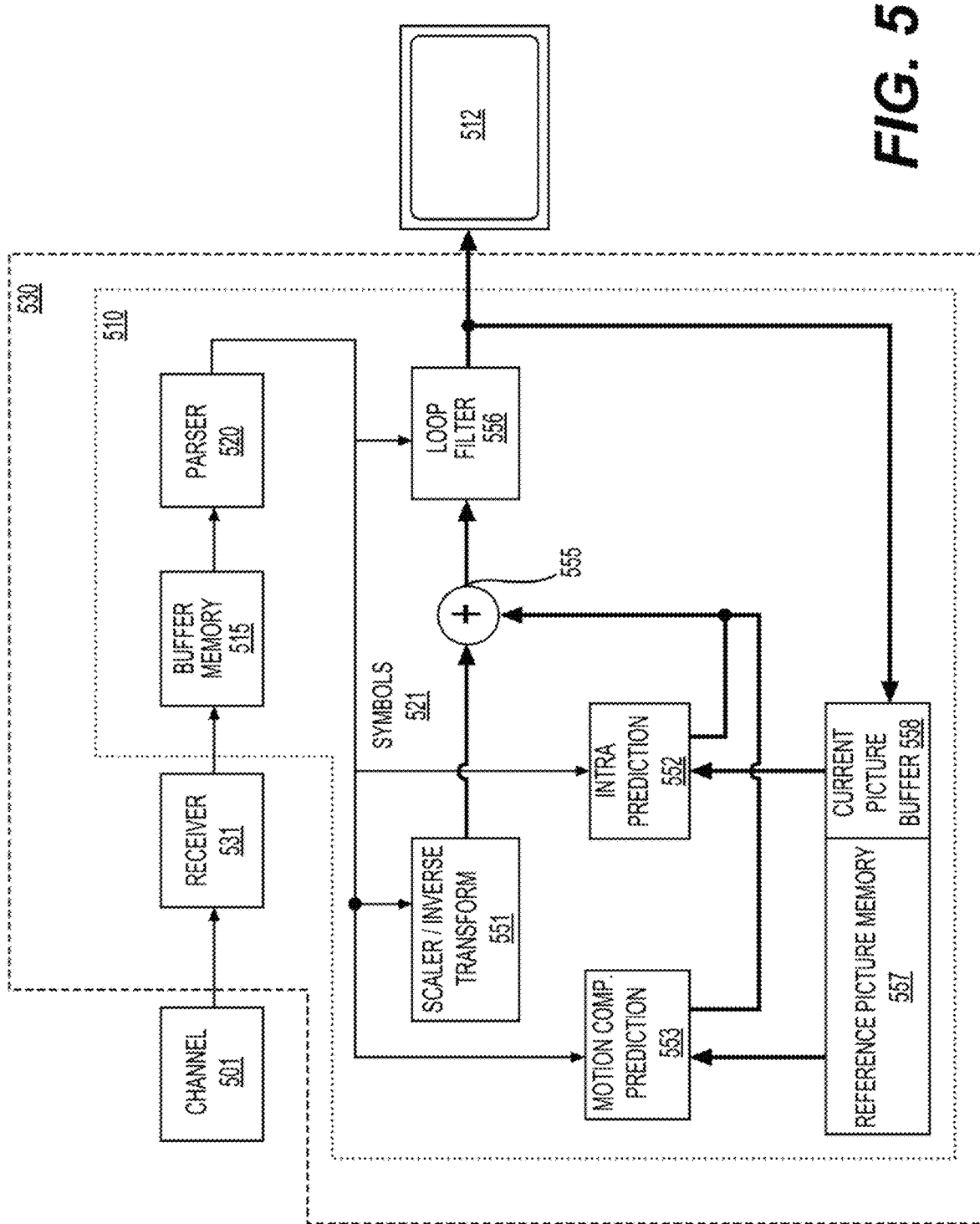
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence.

Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
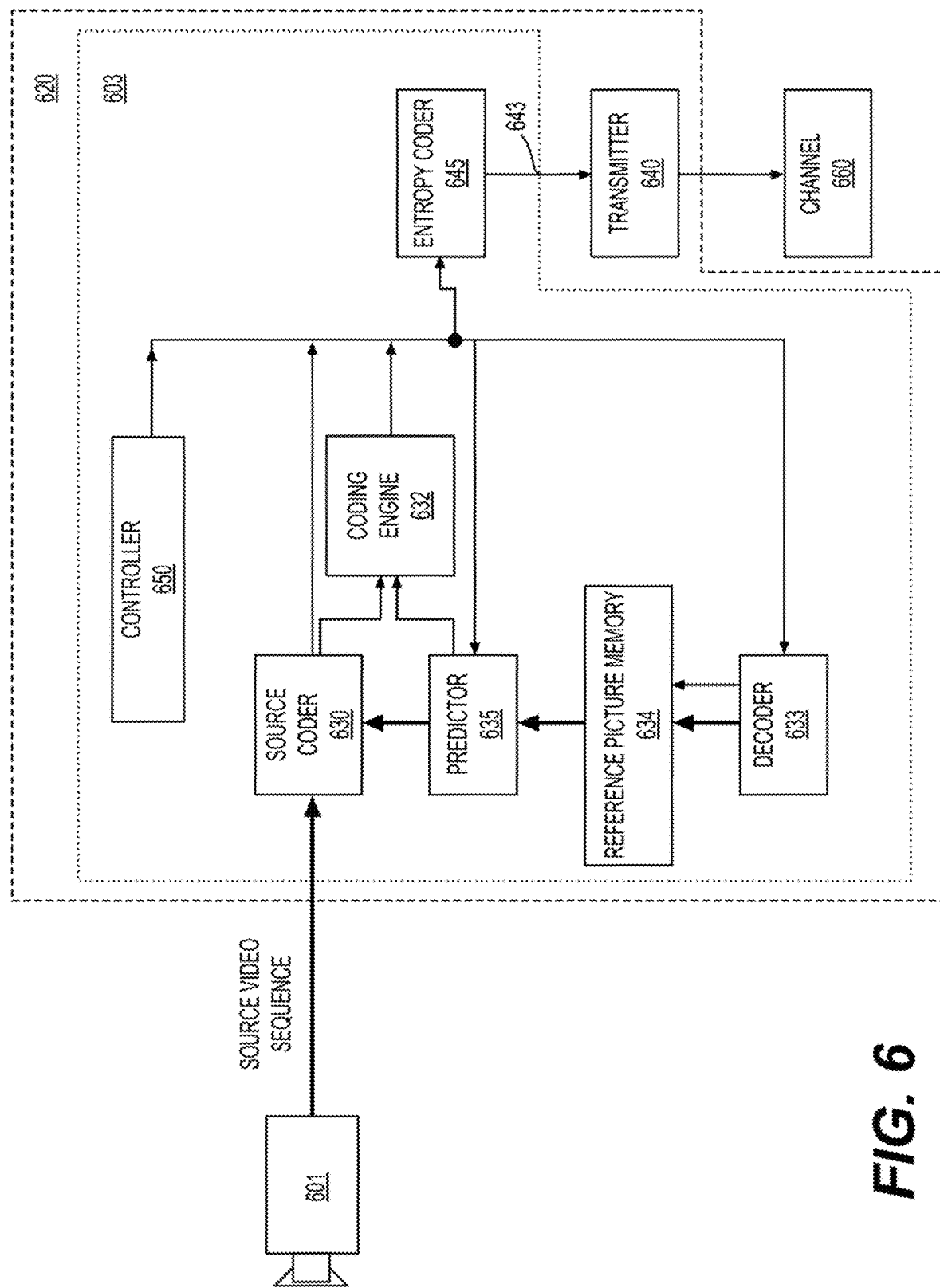
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
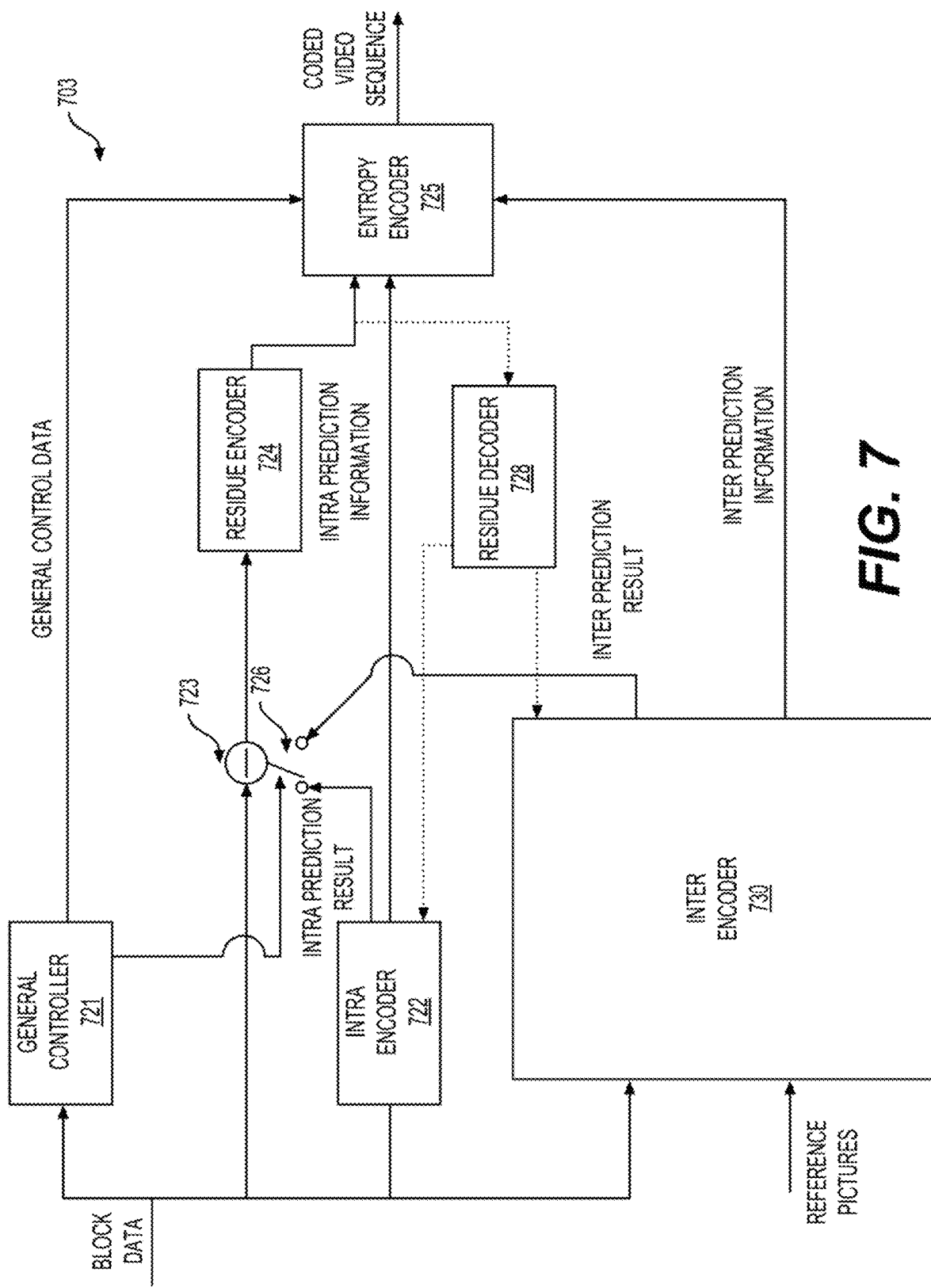
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
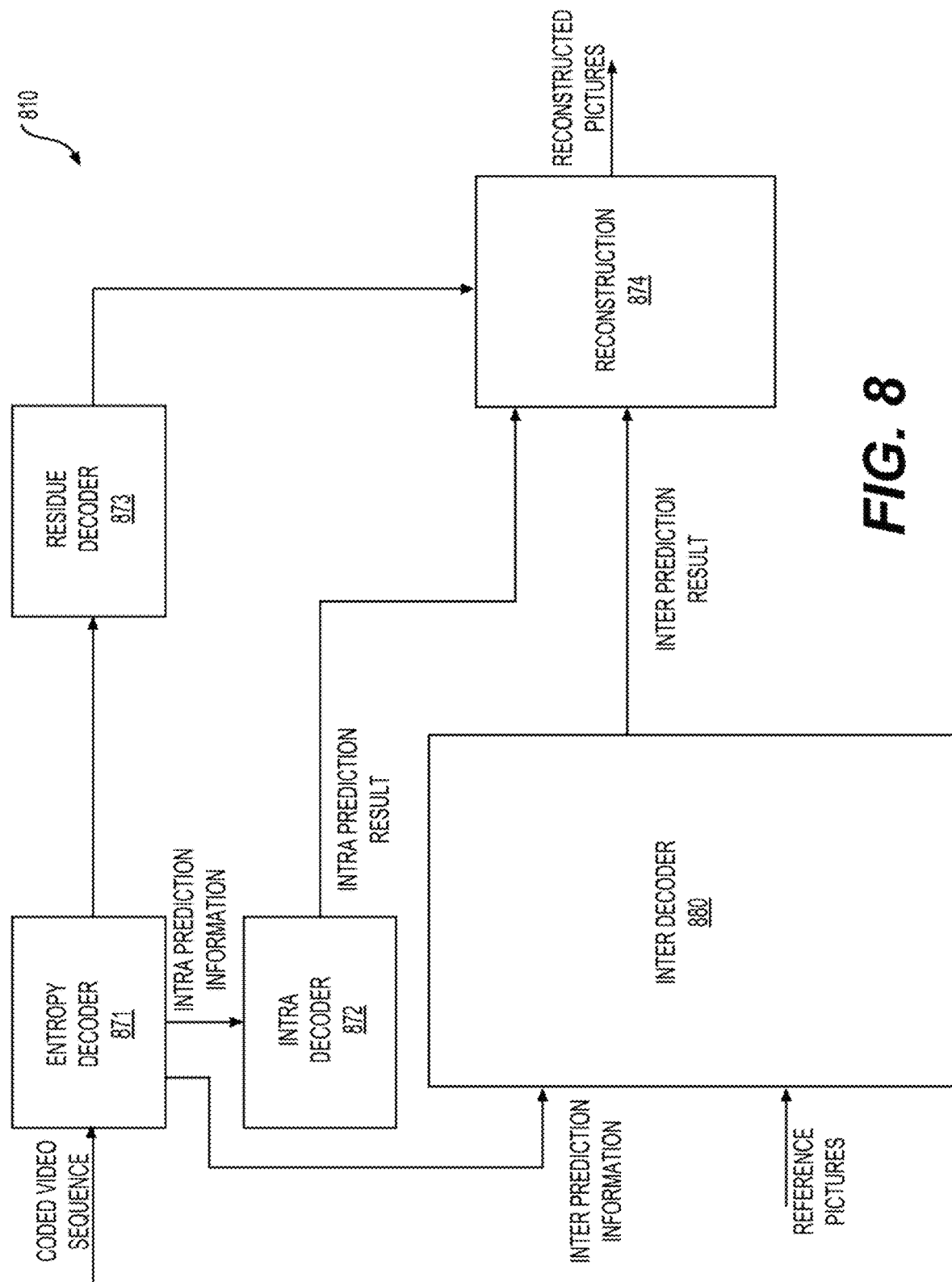
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

This disclosure describes video coding technologies related to neural image compression technologies and/or neural video compression technologies, such as artificial intelligence (AI) based neural image compression (NIC). Aspects of the disclosure include content-adaptive online training in NIC, such as content-adaptive online training NIC methods with post filtering for an end-to-end (E2E) optimized image coding framework based on neural networks. A neural network (NN) can include an artificial neural network (ANN), such as a deep neural network (DNN), a convolution neural network (CNN), or the like.

In an embodiment, a related hybrid video codec is difficult to be optimized as a whole. For example, an improvement of a single module (e.g., an encoder) in the hybrid video codec may not result in a coding gain in the overall performance. In a NN-based video coding framework, different modules can be jointly optimized from an input to an output to improve a final objective (e.g., rate-distortion performance, such as a rate-distortion loss L described in the disclosure) by performing a learning process or a training process (e.g., a machine learning process), and thus resulting in an E2E optimized NIC.

An exemplary NIC framework or system can be described as follows. The NIC framework can use an input block x as an input to a neural network encoder (e.g., an encoder based on neural networks such as DNNs) to compute a compressed representation (e.g., a compact representation) $\hat{x}$ that can be compact, for example, for storage and transmission purposes. A neural network decoder (e.g., a decoder based on neural networks such as DNNs) can use the compressed representation $\hat{x}$ as an input to reconstruct an output block (also referred to as a reconstructed block) $\bar{x}$. In various embodiments, the input block x and reconstructed block $\bar{x}$ are in a spatial domain and the compressed representation $\hat{x}$ is in a domain different from the spatial domain. In some examples, the compressed representation $\hat{x}$ is quantized and entropy coded.

In some examples, a NIC framework can use a variational autoencoder (VAE) structure. In the VAE structure, the neural network encoder can directly use the entire input block x as the input to the neural network encoder. The entire input block x can pass through a set of neural network layers that work as a black box to compute the compressed representation $\hat{x}$. The compressed representation $\hat{x}$ is an output of the neural network encoder. The neural network decoder can take the entire compressed representation $\hat{x}$ as an input. The compressed representation $\hat{x}$ can pass through another set of neural network layers that work as another black box to compute the reconstructed block $\bar{x}$. A rate-distortion (R-D) loss L (x, $\bar{x}$, $\hat{x}$) can be optimized to achieve a trade-off between a distortion loss D (x, $\bar{x}$) of the reconstructed block $\bar{x}$ and bit consumption R of the compact representation $\hat{x}$ with a trade-off hyperparameter λ.

$$L(x,\bar{x},\hat{x}) = \lambda D(x,\bar{x}) + R(\hat{x}) \qquad \text{Eq.1}$$

A neural network (e.g., an ANN) can learn to perform tasks from examples, without task-specific programming. An ANN can be configured with connected nodes or artificial neurons. A connection between nodes can transmit a signal from a first node to a second node (e.g., a receiving node), and the signal can be modified by a weight which can be indicated by a weight coefficient for the connection. The receiving node can process signal(s) (i.e., input signal(s) for the receiving node) from node(s) that transmit the signal(s) to the receiving node and then generate an output signal by applying a function to the input signals. The function can be a linear function. In an example, the output signal is a weighted summation of the input signal(s). In an example, the output signal is further modified by a bias which can be indicated by a bias term, and thus the output signal is a sum of the bias and the weighted summation of the input signal(s). The function can include a nonlinear operation, for example, on the weighted sum or the sum of the bias and the weighted summation of the input signal(s). The output signal can be sent to node(s) (downstream node(s)) connected to the receiving node). The ANN can be represented or configured by parameters (e.g., weights of the connections and/or biases). The weights and/or the biases can be obtained by training the ANN with examples where the weights and/or the biases can be iteratively adjusted. The trained ANN configured with the determined weights and/or the determined biases can be used to perform tasks.

Nodes in an ANN can be organized in any suitable architecture. In various embodiments, nodes in an ANN are organized in layers including an input layer that receives input signal(s) to the ANN and an output layer that outputs output signal(s) from the ANN. In an embodiment, the ANN further includes layer(s) such as hidden layer(s) between the input layer and the output layer. Different layers may perform different kinds of transformations on respective inputs of the different layers. Signals can travel from the input layer to the output layer.

An ANN with multiple layers between an input layer and an output layer can be referred to as a DNN. In an embodiment, a DNN is a feedforward network where data flows from the input layer to the output layer without looping back. In an example, a DNN is a fully connected network where each node in one layer is connected to all nodes in the next layer. In an embodiment, a DNN is a recurrent neural network (RNN) where data can flow in any direction. In an embodiment, a DNN is a CNN.

A CNN can include an input layer, an output layer, and hidden layer(s) between the input layer and the output layer. The hidden layer(s) can include convolutional layer(s) (e.g., used in an encoder) that perform convolutions, such as a two-dimensional (2D) convolution. In an embodiment, a 2D convolution performed in a convolution layer is between a convolution kernel (also referred to as a filter or a channel, such as a 5×5 matrix) and an input signal (e.g., a 2D matrix such as a 2D block, a 256×256 matrix) to the convolution layer. In various examples, a dimension of the convolution kernel (e.g., 5×5) is smaller than a dimension of the input signal (e.g., 256×256). Thus, a portion (e.g., a 5×5 area) in the input signal (e.g., a 256×256 matrix) that is covered by the convolution kernel is smaller than an area (e.g., a 256×256 area) of the input signal, and thus can be referred to as a receptive field in the respective node in the next layer.

During the convolution, a dot product of the convolution kernel and the corresponding receptive field in the input signal is calculated. Thus, each element of the convolution kernel is a weight that is applied to a corresponding sample in the receptive field, and thus the convolution kernel includes weights. For example, a convolution kernel represented by a 5×5 matrix has 25 weights. In some examples, a bias is applied to the output signal of the convolution layer, and the output signal is based on a sum of the dot product and the bias.

The convolution kernel can shift along the input signal (e.g., a 2D matrix) by a size referred to as a stride, and thus the convolution operation generates a feature map or an activation map (e.g., another 2D matrix), which in turn contributes to an input of the next layer in the CNN. For example, the input signal is a 2D block having 256×256 samples, a stride is 2 samples (e.g., a stride of 2). For the stride of 2, the convolution kernel shifts along an X direction (e.g., a horizontal direction) and/or a Y direction (e.g., a vertical direction) by 2 samples.

Multiple convolution kernels can be applied in the same convolution layer to the input signal to generate multiple feature maps, respectively, where each feature map can represent a specific feature of the input signal. In general, a convolution layer with N channels (i.e., N convolution kernels), each convolution kernel having M×M samples, and a stride S can be specified as Conv: M×M cN sS. For example, a convolution layer with 192 channels, each convolution kernel having 5×5 samples, and a stride of 2 is specified as Conv: 5×5 c192 s2. The hidden layer(s) can include deconvolutional layer(s) (e.g., used in a decoder) that perform deconvolutions, such as a 2D deconvolution. A deconvolution is an inverse of a convolution. A deconvolution layer with 192 channels, each deconvolution kernel having 5×5 samples, and a stride of 2 is specified as DeConv: 5×5 c192 s2.

In various embodiments, a CNN has the following benefits. A number of learnable parameters (i.e., parameters to be trained) in a CNN can be significantly smaller than a number of learnable parameters in a DNN, such as a feedforward DNN. In the CNN, a relatively large number of nodes can share a same filter (e.g., same weights) and a same bias (if the bias is used), and thus the memory footprint can be reduced because a single bias and a single vector of weights can be used across all receptive fields that share the same filter. For example, for an input signal having 100×100 samples, a convolution layer with a convolution kernel having 5×5 samples has 25 learnable parameters (e.g., weights). If a bias is used, then one channel uses 26 learnable parameters (e.g., 25 weights and one bias). If the convolution layer has N channels, the total learnable parameters is 26×N. On the other hand, for a fully connected a layer in a DNN, 100×100 (i.e., 10000) weights are used for each node in the next layer. If the next layer has L nodes, then the total learnable parameters is 10000×L.

A CNN can further include one or more other layer(s), such as pooling layer(s), fully connected layer(s) that can connect every node in one layer to every node in another layer, normalization layer(s), and/or the like. Layers in a CNN can be arranged in any suitable order and in any suitable architecture (e.g., a feed-forward architecture, a recurrent architecture). In an example, a convolutional layer is followed by other layer(s), such as pooling layer(s), fully connected layer(s), normalization layer(s), and/or the like.

A pooling layer can be used to reduce dimensions of data by combining outputs from a plurality of nodes at one layer into a single node in the next layer. A pooling operation for a pooling layer having a feature map as an input is described below. The description can be suitably adapted to other input signals. The feature map can be divided into sub-regions (e.g., rectangular sub-regions), and features in the respective sub-regions can be independently down-sampled (or pooled) to a single value, for example, by taking an average value in an average pooling or a maximum value in a max pooling.

The pooling layer can perform a pooling, such as a local pooling, a global pooling, a max pooling, an average pooling, and/or the like. A pooling is a form of nonlinear down-sampling. A local pooling combines a small number of nodes (e.g., a local cluster of nodes, such as 2×2 nodes) in the feature map. A global pooling can combine all nodes, for example, of the feature map.

The pooling layer can reduce a size of the representation, and thus reduce a number of parameters, a memory footprint, and an amount of computation in a CNN. In an example, a pooling layer is inserted between successive convolutional layers in a CNN. In an example, a pooling layer is followed by an activation function, such as a rectified linear unit (ReLU) layer. In an example, a pooling layer is omitted between successive convolutional layers in a CNN.

A normalization layer can be an ReLU, a leaky ReLU, a generalized divisive normalization (GDN), an inverse GDN (IGDN), or the like. An ReLU can apply a non-saturating activation function to remove negative values from an input signal, such as a feature map, by setting the negative values to zero. A leaky ReLU can have a small slope (e.g., 0.01) for negative values instead of a flat slope (e.g., 0). Accordingly, if a value x is larger than 0, then an output from the leaky ReLU is x. Otherwise, the output from the leaky ReLU is the value x multiplied by the small slope (e.g., 0.01). In an example, the slope is determined before training, and thus is not learnt during training.

Figure 9A:
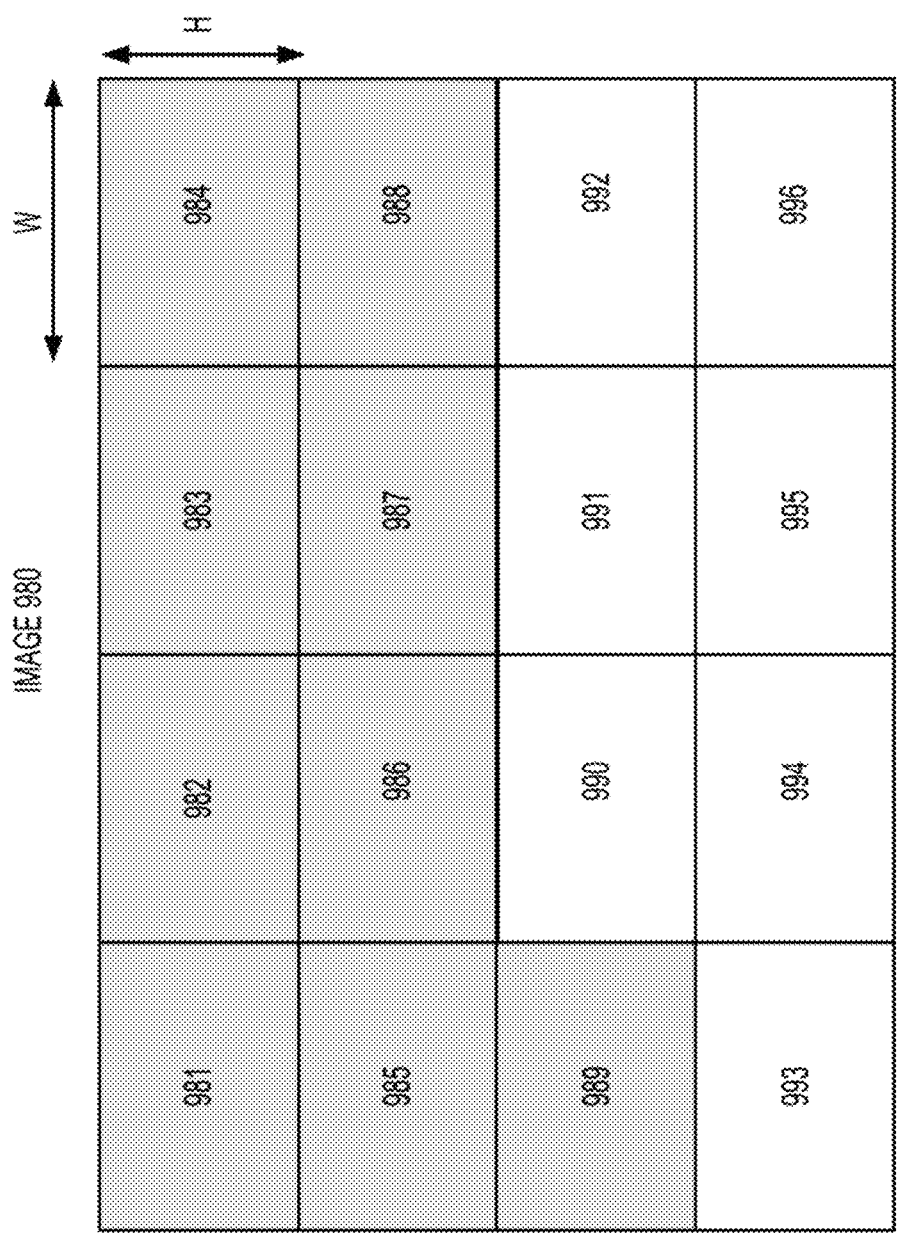
FIG. 9A shows an example of a block-wise image coding according to an embodiment of the disclosure.

In NN-based image compression methods, such as DNN-based or CNN-based image compression methods, instead of directly encoding an entire image, the block-based or block-wise coding mechanism can be effective for compressing images in a DNN-based video coding standards such as FVC. An entire image can be partitioned into blocks of the same (or various) sizes, and the blocks can be compressed individually. In an embodiment, an image may be split into blocks with an equal size or non-equal sizes. The spilt blocks instead of the image can be compressed. FIG. 9A shows an example of a block-wise image coding according to an embodiment of the disclosure. An image (980) can be partitioned into blocks, e.g., blocks (981)-(996). The blocks (981)-(996) can be compressed, for example, according to a scanning order. IN an example shown in FIG. 9A, the blocks (981)-(989) are already compressed, and the blocks (990)-(996) are to be compressed.

In an embodiment, an image is treated as a block where the block is the entire image, and the image is compressed without being split into blocks. The entire image can be the input of an E2E NIC framework.

Figure 9B:
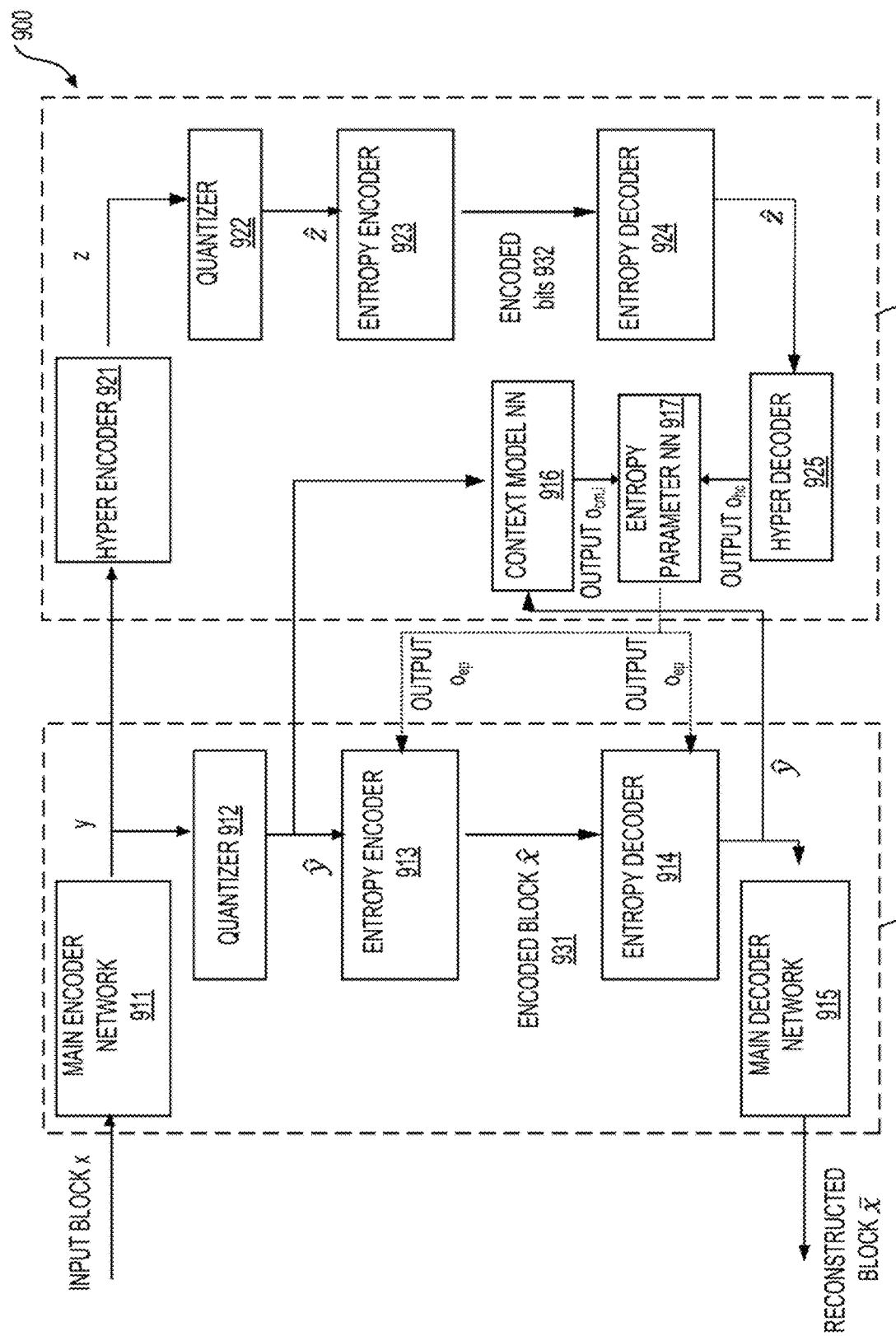
FIG. 9B shows an exemplary NIC framework according to an embodiment of the disclosure.

FIG. 9B shows an exemplary NIC framework (900) (e.g., a NIC system) according to an embodiment of the disclosure. The NIC framework (900) can be based on neural networks, such as DNNs and/or CNNs. The NIC framework (900) can be used to compress (e.g., encode) blocks and decompress (e.g., decode or reconstruct) compressed blocks (e.g., encoded blocks). The NIC framework (900) can include two sub-neural networks, a first sub-NN (951) and a second sub-NN (952) that are implemented using neural networks.

The first sub-NN (951) can resemble an autoencoder and can be trained to generate a compressed block $\hat{x}$ of an input block x and decompress the compressed block (i.e., the encoded block) $\hat{x}$ to obtain a reconstructed block $\bar{x}$. The first sub-NN (951) can include a plurality of components (or modules), such as a main encoder neural network (or a main encoder network) (911), a quantizer (912), an entropy encoder (913), an entropy decoder (914), and a main decoder neural network (or a main encoder network) (915). Referring to FIG. 9B, the main encoder network (911) can generate a latent or a latent representation y from the input block x (e.g., a block to be compressed or encoded). In an example, the main encoder network (911) is implemented using a CNN. A relationship between the latent representation y and the input block x can be described using Eq. 2.

$$y = f_1(x; \theta_1) \quad \text{Eq. 2}$$

where a parameter $\theta_1$ represents parameters, such as weights used in convolution kernels in the main encoder network (911) and biases (if biases are used in the main encoder network (911)).

The latent representation y can be quantized using the quantizer (912) to generate a quantized latent $\hat{y}$. The quantized latent $\hat{y}$ can be compressed, for example, using lossless compression by the entropy encoder (913) to generate the compressed block (e.g., an encoded block) $\hat{x}$ (931) that is a compressed representation $\hat{x}$ of the input block x. The entropy encoder (913) can use entropy coding techniques such as Huffman coding, arithmetic coding, or the like. In an example, the entropy encoder (913) uses arithmetic encoding and is an arithmetic encoder. In an example, the encoded block (931) is transmitted in a coded bitstream.

The encoded block (931) can be decompressed (e.g., entropy decoded) by the entropy decoder (914) to generate an output. The entropy decoder (914) can use entropy coding techniques such as Huffman coding, arithmetic coding, or the like that correspond to the entropy encoding techniques used in the entropy encoder (913). In an example, the entropy decoder (914) uses arithmetic decoding and is an arithmetic decoder. In an example, lossless compression is used in the entropy encoder (913), lossless decompression is used in the entropy decoder (914), and noises, such as due to the transmission of the encoded block (931) are omissible, the output from the entropy decoder (914) is the quantized latent $\hat{y}$.

The main decoder network (915) can decode the quantized latent $\hat{y}$ to generate the reconstructed block $\bar{x}$. In an example, the main decoder network (915) is implemented using a CNN. A relationship between the reconstructed block $\bar{x}$ (i.e., the output of the main decoder network (915)) and the quantized latent $\hat{y}$ (i.e., the input of the main decoder network (915)) can be described using Eq. 3.

$$\bar{x} = f_2(\hat{y}; \theta_2) \quad \text{Eq. 3}$$

where a parameter $\theta_2$ represents parameters, such as weights used in convolution kernels in the main decoder network (915) and biases (if biases are used in the main decoder network (915)). Thus, the first sub-NN (951) can compress (e.g., encode) the input block x to obtain the encoded block (931) and decompress (e.g., decode) the encoded block (931) to obtain the reconstructed block $\bar{x}$. The reconstructed block $\bar{x}$ can be different from the input block x due to quantization loss introduced by the quantizer (912).

The second sub-NN (952) can learn the entropy model (e.g., a prior probabilistic model) over the quantized latent $\hat{y}$ used for entropy coding. Thus, the entropy model can be a conditioned entropy model, e.g., a Gaussian mixture model (GMM), a Gaussian scale model (GSM) that is dependent on the input block x. The second sub-NN (952) can include a context model NN (916), an entropy parameter NN (917), a hyper encoder (921), a quantizer (922), an entropy encoder (923), an entropy decoder (924), and a hyper decoder (925). The entropy model used in the context model NN (916) can be an autoregressive model over latent (e.g., the quantized latent $\hat{y}$). In an example, the hyper encoder (921), the quantizer (922), the entropy encoder (923), the entropy decoder (924), and the hyper decoder (925) form a hyper neural network (e.g., a hyperprior NN). The hyper neural network can represent information useful for correcting context-based predictions. Data from the context model NN (916) and the hyper neural network can be combined by the entropy parameter NN (917). The entropy parameter NN (917) can generate parameters, such as mean and scale parameters for the entropy model such as a conditional Gaussian entropy model (e.g., the GMM).

Referring to FIG. 9B, at an encoder side, the quantized latent $\hat{y}$ from the quantizer (912) is fed into the context model NN (916). At a decoder side, the quantized latent $\hat{y}$ from the entropy decoder (914) is fed into the context model NN (916). The context model NN (916) can be implemented using a neural network, such as a CNN. The context model NN (916) can generate an output $o_{cm,i}$ based on a context $\hat{y}_{<i}$ that is the quantized latent $\hat{y}$ available to the context model NN (916). The context $\hat{y}_{<i}$ can include previously quantized latent at the encoder side or previously entropy decoded quantized latent at the decoder side. A relationship between the output $o_{cm,i}$ and the input (e.g., $\hat{y}_{<i}$) of the context model NN (916) can be described using Eq. 4.

$$o_{cm,i} = f_3(\hat{y}_{<i}; \theta_3) \quad \text{Eq. 4}$$

where a parameter $\theta_3$ represents parameters, such as weights used in convolution kernels in the context model NN (916) and biases (if biases are used in the context model NN (916)).

The output $o_{cm,i}$ from the context model NN (916) and an output $o_{hc}$ from the hyper decoder (925) are fed into the entropy parameter NN (917) to generate an output $o_{ep}$. The entropy parameter NN (917) can be implemented using a neural network, such as a CNN. A relationship between the output $o_{ep}$ and the inputs (e.g., $o_{cm,i}$ and $o_{hc}$) of the entropy parameter NN (917) can be described using Eq. 5.

$$o_{ep}=f_4(o_{cm,i},o_{hc};\theta_4) \quad \text{Eq. 5}$$

where a parameter $\theta_4$ represents parameters, such as weights used in convolution kernels in the entropy parameter NN (917) and biases (if biases are used in the entropy parameter NN (917)). The output $o_{ep}$ of the entropy parameter NN (917) can be used in determining (e.g., conditioning) the entropy model, and thus the conditioned entropy model can be dependent on the input block x, for example, via the output $o_{hc}$ from the hyper decoder (925). In an example, the output $o_{ep}$ includes parameters, such as the mean and scale parameters, used to condition the entropy model (e.g., GMM). Referring to FIG. 9B, the entropy model (e.g., the conditioned entropy model) can be employed by the entropy encoder (913) and the entropy decoder (914) in entropy coding and entropy decoding, respectively.

The second sub-NN (952) can be described below. The latent y can be fed into the hyper encoder (921) to generate a hyper latent z. In an example, the hyper encoder (921) is implemented using a neural network, such as a CNN. A relationship between the hyper latent z and the latent y can be described using Eq. 6.

$$z=f_5(y;\theta_5) \quad \text{Eq. 6}$$

where a parameter $\theta_5$ represents parameters, such as weights used in convolution kernels in the hyper encoder (921) and biases (if biases are used in the hyper encoder (921)).

The hyper latent z is quantized by the quantizer (922) to generate a quantized latent $\hat{z}$. The quantized latent $\hat{z}$ can be compressed, for example, using lossless compression by the entropy encoder (923) to generate side information, such as encoded bits (932) from the hyper neural network. The entropy encoder (923) can use entropy coding techniques such as Huffman coding, arithmetic coding, or the like. In an example, the entropy encoder (923) uses arithmetic encoding and is an arithmetic encoder. In an example, the side information, such as the encoded bits (932), can be transmitted in the coded bitstream, for example, together with the encoded block (931).

The side information, such as the encoded bits (932), can be decompressed (e.g., entropy decoded) by the entropy decoder (924) to generate an output. The entropy decoder (924) can use entropy coding techniques such as Huffman coding, arithmetic coding, or the like. In an example, the entropy decoder (924) uses arithmetic decoding and is an arithmetic decoder. In an example, lossless compression is used in the entropy encoder (923), lossless decompression is used in the entropy decoder (924), and noises, such as due to the transmission of the side information are omissible, the output from the entropy decoder (924) can be the quantized latent $\hat{z}$. The hyper decoder (925) can decode the quantized latent $\hat{z}$ to generate the output $o_{hc}$. A relationship between the output $o_{hc}$ and the quantized latent $\hat{z}$ can be described using Eq. 7.

$$o_{hc}=f_6(\hat{z};\theta_6) \quad \text{Eq. 7}$$

where a parameter $\theta_6$ represents parameters, such as weights used in convolution kernels in the hyper decoder (925) and biases (if biases are used in the hyper decoder (925)).

As described above, the compressed or encoded bits (932) can be added to the coded bitstream as the side information, which enables the entropy decoder (914) to use the conditional entropy model. Thus, the entropy model can be block-dependent and spatially adaptive, and thus can be more accurate than a fixed entropy model.

The NIC framework (900) can be suitably adapted, for example, to omit one or more components shown in FIG. 9B, to modify one or more components shown in FIG. 9B, and/or to include one or more components not shown in FIG. 9B. In an example, a NIC framework using a fixed entropy model includes the first sub-NN (951), and does not include the second sub-NN (952). In an example, a NIC framework includes the components in the NIC framework (900) except the entropy encoder (923) and the entropy decoder (924).

In an embodiment, one or more components in the NIC framework (900) shown in FIG. 9B are implemented using neural network(s), such as CNN(s). Each NN-based component (e.g., the main encoder network (911), the main decoder network (915), the context model NN (916), the entropy parameter NN (917), the hyper encoder (921), or the hyper decoder (925)) in a NIC framework (e.g., the NIC framework (900)) can include any suitable architecture (e.g., have any suitable combinations of layers), include any suitable types of parameters (e.g., weights, biases, a combination of weights and biases, and/or the like), and include any suitable number of parameters.

In an embodiment, the main encoder network (911), the main decoder network (915), the context model NN (916), the entropy parameter NN (917), the hyper encoder (921), and the hyper decoder (925) are implemented using respective CNNs.

FIG. 10 shows an exemplary CNN of the main encoder network (911) according to an embodiment of the disclosure. For example, the main encoder network (911) includes four sets of layers where each set of layers includes a convolution layer 5×5 c192 s2 followed by a GDN layer. One or more layers shown in FIG. 10 can be modified and/or omitted. Additional layer(s) can be added to the main encoder network (911).

FIG. 11 shows an exemplary CNN of the main decoder network (915) according to an embodiment of the disclosure. For example, the main decoder network (915) includes three sets of layers where each set of layers includes a deconvolution layer 5×5 c192 s2 followed by an IGDN layer. In addition, the three sets of layers are followed by a deconvolution layer 5×5 c3 s2 followed by an IGDN layer. One or more layers shown in FIG. 11 can be modified and/or omitted. Additional layer(s) can be added to the main decoder network (915).

FIG. 12 shows an exemplary CNN of the hyper encoder (921) according to an embodiment of the disclosure. For example, the hyper encoder (921) includes a convolution layer 3×3 c192 s1 followed by a leaky ReLU, a convolution layer 5×5 c192 s2 followed by a leaky ReLU, and a convolution layer 5×5 c192 s2. One or more layers shown in FIG. 12 can be modified and/or omitted. Additional layer(s) can be added to the hyper encoder (921).

FIG. 13 shows an exemplary CNN of the hyper decoder (925) according to an embodiment of the disclosure. For example, the hyper decoder (925) includes a deconvolution layer 5×5 c192 s2 followed by a leaky ReLU, a deconvolution layer 5×5 c288 s2 followed by a leaky ReLU, and a deconvolution layer 3×3 c384 s1. One or more layers shown in FIG. 13 can be modified and/or omitted. Additional layer(s) can be added to the hyper decoder (925).

FIG. 14 shows an exemplary CNN of the context model NN (916) according to an embodiment of the disclosure. For example, the context model NN (916) includes a masked convolution 5×5 c384 s1 for context prediction, and thus the context $\hat{y}_{<i}$ in Eq. 4 includes a limited context (e.g., a 5×5 convolution kernel). The convolution layer in FIG. 14 can be modified. Additional layer(s) can be added to the context model NN (916).

FIG. 15 shows an exemplary CNN of the entropy parameter NN (917) according to an embodiment of the disclosure. For example, the entropy parameter NN (917) includes a convolution layer 1×1 c640 s1 followed by a leaky ReLU, a convolution layer 1×1 c512 s1 followed by leaky ReLU, and a convolution layer 1×1 c384 s1. One or more layers shown in FIG. 15 can be modified and/or omitted. Additional layer(s) can be added to the entropy parameter NN (917).

The NIC framework (900) can be implemented using CNNs, as described with reference to FIGS. 10-15. The NIC framework (900) can be suitably adapted such that one or more components (e.g., (911), (915), (916), (917), (921), and/or (925)) in the NIC framework (900) are implemented using any suitable types of neural networks (e.g., CNNs or non-CNN based neural networks). One or more other components the NIC framework (900) can be implemented using neural network(s).

The NIC framework (900) that includes neural networks (e.g., CNNs) can be trained to learn the parameters used in the neural networks. For example, when CNNs are used, the parameters represented by $\theta_1$-$\theta_6$, such as the weights used in the convolution kernels in the main encoder network (911) and biases (if biases are used in the main encoder network (911)), the weights used in the convolution kernels in the main decoder network (915) and biases (if biases are used in the main decoder network (915)), the weights used in the convolution kernels in the hyper encoder (921) and biases (if biases are used in the hyper encoder (921)), the weights used in the convolution kernels in the hyper decoder (925) and biases (if biases are used in the hyper decoder (925)), the weights used in the convolution kernel(s) in the context model NN (916) and biases (if biases are used in the context model NN (916)), and the weights used in the convolution kernels in the entropy parameter NN (917) and biases (if biases are used in the entropy parameter NN (917)), respectively, can be learned in the training process.

In an example, referring to FIG. 10, the main encoder network (911) includes four convolution layers where each convolution layer has a convolution kernel of 5×5 and 192 channels. Thus, a number of the weights used in the convolution kernels in the main encoder network (911) is 19200 (i.e., 4×5×5×192). The parameters used in the main encoder network (911) include the 19200 weights and optional biases. Additional parameter(s) can be included when biases and/or additional NN(s) are used in the main encoder network (911).

Referring to FIG. 9B, the NIC framework (900) includes at least one component or module built on neural network(s). The at least one component can include one or more of the main encoder network (911), the main decoder network (915), the hyper encoder (921), the hyper decoder (925), the context model NN (916), and the entropy parameter NN (917). The at least one component can be trained individually. In an example, the training process is used to learn the parameters for each component separately. The at least one component can be trained jointly as a group. In an example, the training process is used to learn the parameters for a subset of the at least one component jointly. In an example, the training process is used to learn the parameters for all of the at least one component, and thus is referred to as an E2E optimization.

In the training process for one or more components in the NIC framework (900), the weights (or the weight coefficients) of the one or more components can be initialized. In an example, the weights are initialized based on pre-trained corresponding neural network model(s) (e.g., DNN models, CNN models). In an example, the weights are initialized by setting the weights to random numbers.

A set of training blocks can be employed to train the one or more components, for example, after the weights are initialized. The set of training blocks can include any suitable blocks having any suitable size(s). In some examples, the set of training blocks includes blocks from raw images, natural images, computer-generated images, and/or the like that are in the spatial domain. In some examples, the set of training blocks includes blocks from residue blocks or residue images having residue data in the spatial domain. The residue data can be calculated by a residue calculator (e.g., the residue calculator (723)). In some examples, raw images and/or residue images including residue data can be used directly to train neural networks in a NIC framework, such as the NIC framework (900). Thus, raw images, residue images, blocks from raw images, and/or blocks from residue images can be used to train neural networks in a NIC framework.

For purposes of brevity, the training process below is described using a training block as an example. The description can be suitably adapted to a training image. A training block t of the set of training blocks can be passed through the encoding process in FIG. 9B to generate a compressed representation (e.g., encoded information, for example, to a bitstream). The encoded information can be passed through the decoding process described in FIG. 9B to compute and reconstruct a reconstructed block $\bar{t}$.

For the NIC framework (900), two competing targets, e.g., a reconstruction quality and a bit consumption are balanced. A quality loss function (e.g., a distortion or distortion loss) D (t, $\bar{t}$) can be used to indicate the reconstruction quality, such as a difference between the reconstruction (e.g., the reconstructed block $\bar{t}$) and an original block (e.g., the training block t). A rate (or a rate loss) R can be used to indicate the bit consumption of the compressed representation. In an example, the rate loss R further includes the side information, for example, used in determining a context model.

For neural image compression, differentiable approximations of quantization can be used in E2E optimization. In various examples, in the training process of neural network-based image compression, noise injection is used to simulate quantization, and thus quantization is simulated by the noise injection instead of being performed by a quantizer (e.g., the quantizer (912)). Thus, training with noise injection can approximate the quantization error variationally. A bits per pixel (BPP) estimator can be used to simulate an entropy coder, and thus entropy coding is simulated by the BPP estimator instead of being performed by an entropy encoder (e.g., (913)) and an entropy decoder (e.g., (914)). Therefore, the rate loss R in the loss function L shown in Eq. 1 during the training process can be estimated, for example, based on the noise injection and the BPP estimator. In general, a higher rate R can allow for a lower distortion D, and a lower rate R can lead to a higher distortion D. Thus, a trade-off hyperparameter $\lambda$ in Eq. 1 can be used to optimize a joint R-D loss L where L as a summation of $\lambda$D and R can be optimized. The training process can be used to adjust the parameters of the one or more components (e.g., (911) (915)) in the NIC framework (900) such that the joint R-D loss L is minimized or optimized. In some examples, a trade-off hyperparameter λ can be used to optimize the joint Rate-Distortion (R-D) loss as:

$$L(x,\bar{x},\hat{r}_1,\ldots,\hat{r}_N,\hat{y}) = \lambda D(x,\bar{x}) + R(\Sigma_1{}^n s_i, \Sigma_1{}^n u_i) + \beta E \qquad \text{Eq. 8}$$

where E measures the distortion of the decoded block residuals compared with the original block residuals before encoding, which acts as regularization loss for the residual encoding/decoding DNNs and the encoding/decoding DNNs. β is a hyperparameter to balance the importance of the regularization loss.

Various models can be used to determine the distortion loss D and the rate loss R, and thus to determine the joint R-D loss L in Eq. 1. In an example, the distortion loss D (t, t̂) is expressed as a peak signal-to-noise ratio (PSNR) that is a metric based on mean squared error, a multiscale structural similarity (MS-SSIM) quality index, a weighted combination of the PSNR and MS-SSIM, or the like.

In an example, the target of the training process is to train the encoding neural network (e.g., the encoding DNN), such as a video encoder to be used on an encoder side and the decoding neural network (e.g., the decoding DNN), such as a video decoder to be used on a decoder side. In an example, referring to FIG. 9B, the encoding neural network can include the main encoder network (911), the hyper encoder (921), the hyper decoder (925), the context model NN (916), and the entropy parameter NN (917). The decoding neural network can include the main decoder network (915), the hyper decoder (925), the context model NN (916), and the entropy parameter NN (917). The video encoder and/or the video decoder can include other component(s) that are based on NN(s) and/or not based on NN(s).

The NIC framework (e.g., the NIC framework (900)) can be trained in an E2E fashion. In an example, the encoding neural network and the decoding neural network are updated jointly in the training process based on backpropagated gradients in an E2E fashion.

After the parameters of the neural networks in the NIC framework (900) are trained, one or more components in the NIC framework (900) can be used to encode and/or decode blocks. In an embodiment, on the encoder side, the video encoder is configured to encode the input block x into the encoded block (931) to be transmitted in the bitstream. The video encoder can include multiple components in the NIC framework (900). In an embodiment, on the decoder side, the corresponding video decoder is configured to decode the encoded block (931) in the bitstream into the reconstructed block x̄. The video decoder can include multiple components in the NIC framework (900).

In an example, the video encoder includes all the components in the NIC framework (900).

Figure 16A:
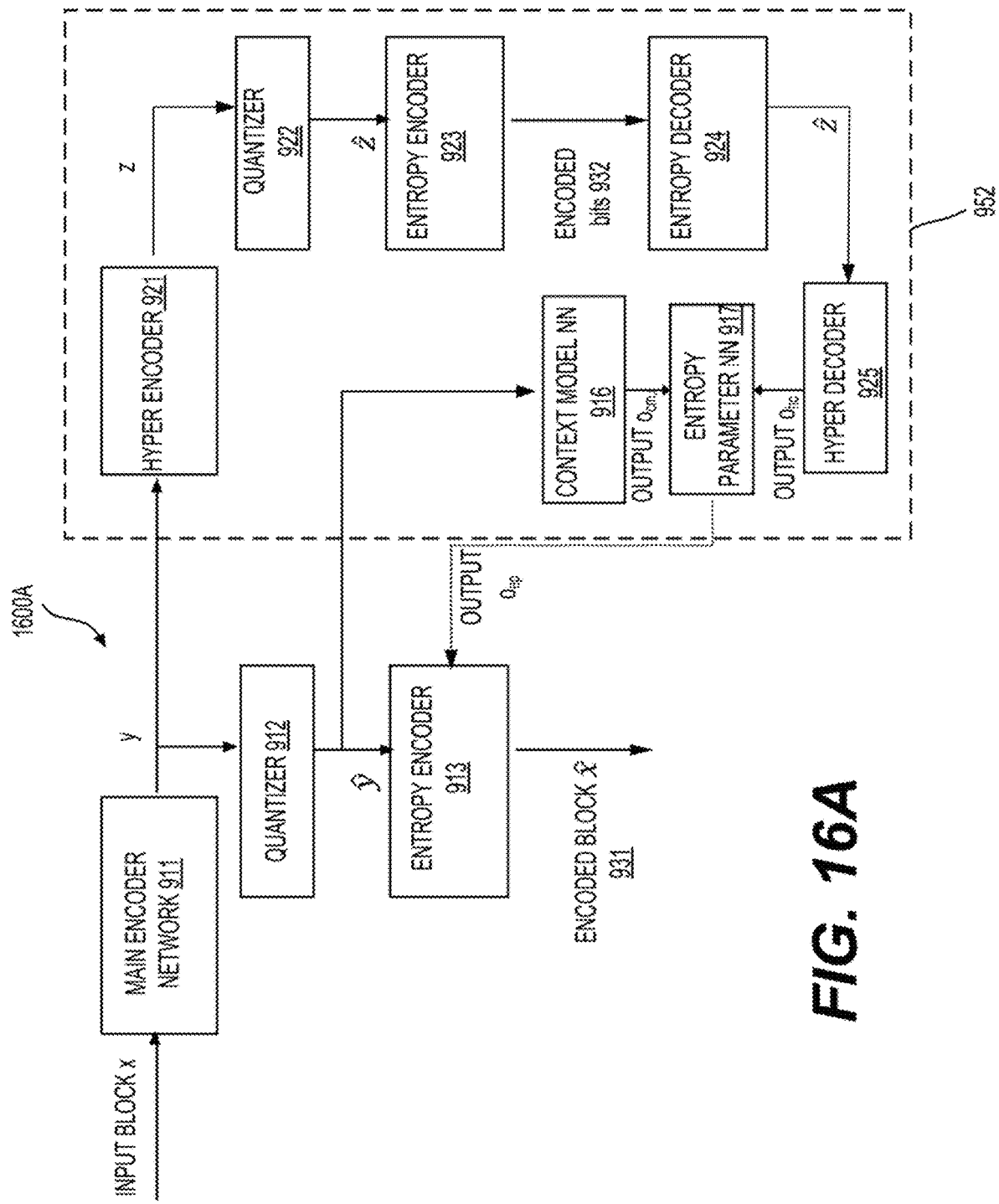
FIG. 16A shows an exemplary video encoder according to an embodiment of the disclosure.
Figure 16B:
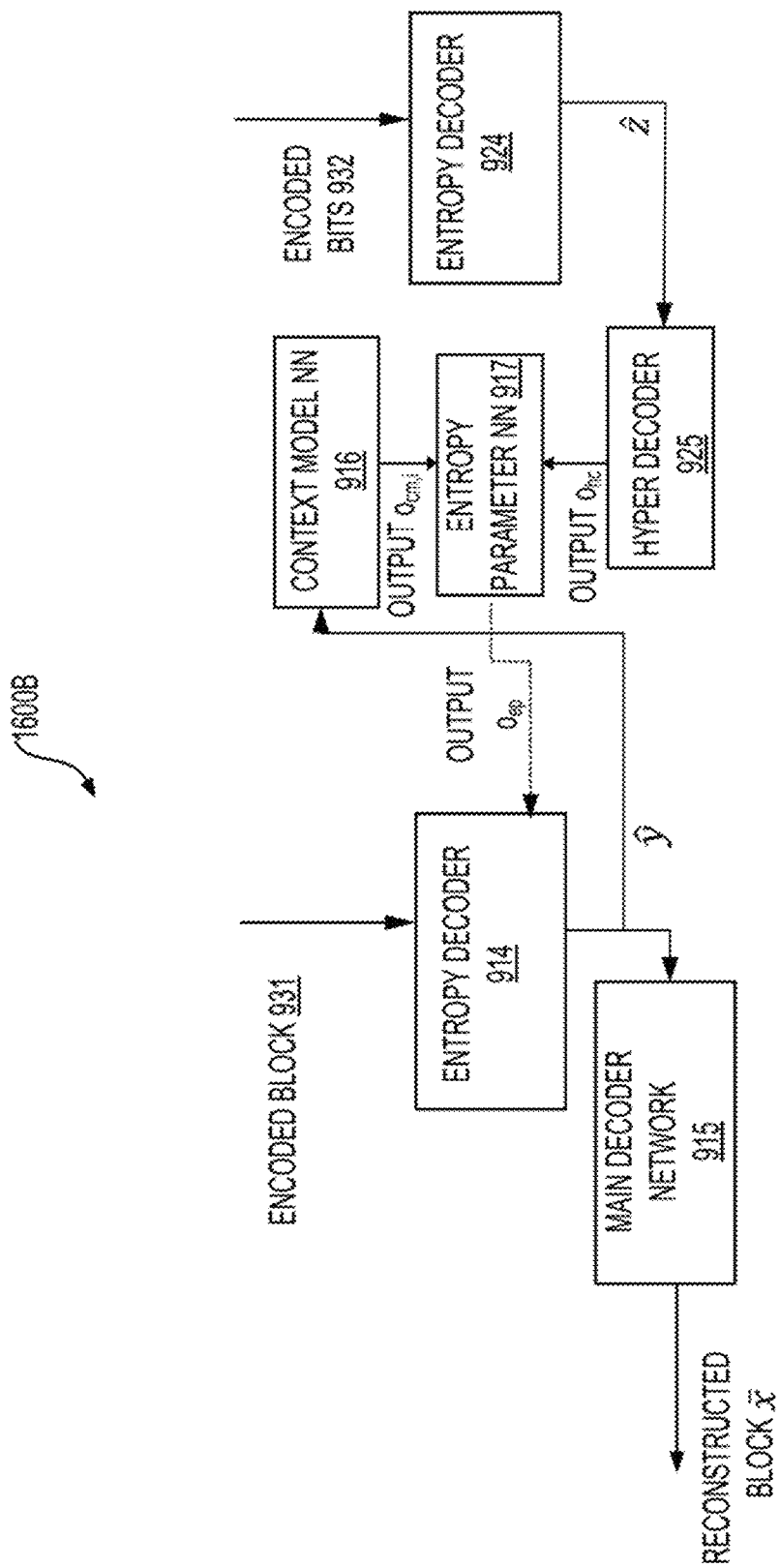
FIG. 16B shows an exemplary video decoder according to an embodiment of the disclosure.

FIG. 16A shows an exemplary video encoder (1600A) according to an embodiment of the disclosure. The video encoder (1600A) includes the main encoder network (911), the quantizer (912), the entropy encoder (913), and the second sub-NN (952) that are described with reference to FIG. 9B for example. FIG. 16B shows an exemplary video decoder (1600B) according to an embodiment of the disclosure. The video decoder (1600B) can correspond to the video encoder (1600A). The video decoder (1600B) can include the main decoder network (915), the entropy decoder (914), the context model NN (916), the entropy parameter NN (917), the entropy decoder (924), and the hyper decoder (925). Referring to FIGS. 16A-16B, on the encoder side, the video encoder (1600A) can generate the encoded block (931) and the encoded bits (932) to be transmitted in the bitstream. On the decoder side, the video decoder (1600B) can receive and decode the encoded block (931) and the encoded bits (932).

FIGS. 17-18 show an exemplary video encoder (1700) and a corresponding video decoder (1800), respectively, according to embodiments of the disclosure. Referring to FIG. 17, the encoder (1700) includes the main encoder network (911), the quantizer (912), and the entropy encoder (913). Examples of the main encoder network (911), the quantizer (912), and the entropy encoder (913) are described with reference to FIG. 9B. Referring to FIG. 18, the video decoder (1800) includes the main decoder network (915) and the entropy decoder (914). Examples of the main decoder network (915) and the entropy decoder (914) are described with reference to FIG. 9B. Referring to FIGS. 17 and 18, the video encoder (1700) can generate the encoded block (931) to be included in the bitstream. The video decoder (1800) can receive and decode the encoded block (931).

Video coding technologies can include filtering operations that are performed on reconstructed samples so that artifacts (e.g., a blocking effect) can be reduced. A deblocking filter process can be used in such a filtering operation, in which a block boundary (e.g., a boundary region) between adjacent blocks can be filtered so that a smoother transition of sample values from one block to another block can be achieved.

In some related examples (e.g., HEVC), a deblocking process or a deblocking filter process can be applied to samples adjacent to the block boundary. The deblocking filter process can be performed for each CU in the same order as the decoding process. For example, the deblocking filter process can be performed by horizontal filtering for vertical boundaries for an image first, followed by vertical filtering for horizontal boundaries for the image. Filtering can be applied to 8×8 block boundaries which are determined to be filtered, both for luma and chroma components. In an example, 4×4 block boundaries are not processed in order to reduce the complexity.

A boundary strength (BS) can be used to indicate a degree or strength of the deblocking filter process. In an embodiment, a value of 2 for BS indicates strong filtering, 1 indicates weak filtering, and 0 indicates no deblocking filtering.

Blocks of an image can be reconstructed from a coded video bitstream using any suitable methods, such as the embodiments in the disclosure. For example, the blocks are reconstructed using a video decoder (e.g., (1600B), (1800)), for example, including neural networks (e.g., CNN(s)). In some examples, the blocks are reconstructed using a video decoder that is not based on NNs. One or more deblocking methods (also referred to as deblocking, a deblocking process, a deblocking filtering process) can be used to reduce artifacts among blocks, such as artifacts in a boundary region of neighboring reconstructed blocks. Deblocking can reduce blocking artifacts or blocking effect between the neighboring reconstructed blocks, for example, caused by independent quantization in neighboring reconstructed blocks. Deblocking can be performed on the boundary region of the neighboring reconstructed blocks with a deblocking module. To reduce the artifacts among the blocks, a NN-based deblocking model can be used. The NN-based deblocking model can be a DNN-based deblocking model, a CNN-based deblocking model, or the like. The NN-based deblocking model can be implemented using a NN (e.g., a deblocking NN) including DNN(s), CNN(s), or the like.

FIGS. 19A-19C show an exemplary deblocking process (1900) according to an embodiment of the disclosure. Referring to FIG. 19A, an image (1901) can include a plurality of blocks (1911)-(1914). For brevity, four equal-sized blocks (1911)-(1914) are illustrated in FIG. 19A. In general, an image can be partitioned into any suitable number of blocks, and sizes of the blocks can be different or identical, and the description can be suitably adapted. In some examples, regions that include artifacts, for example, due to partitioning an image to blocks, can be processed by deblocking.

In an example, the blocks (1911)-(1914) are reconstructed blocks from the main decoder network (915). The image (1901) is a reconstructed image. In some examples, the reconstructed image (1901) includes residue data.

First two neighboring reconstructed blocks of the reconstructed blocks (1911)-(1914) can include the blocks (1911) and (1913) separated by a first shared boundary (1941). The blocks (1911) and (1913) can include a boundary region A having samples on both sides of the first shared boundary (1941). Referring to FIGS. 19A-19B, the boundary region A can include sub-boundary regions A1 and A2 that are located in the blocks (1911) and (1913), respectively. The first two neighboring reconstructed blocks (1911) and (1913) can include the boundary region A having samples on both sides of the first shared boundary (1941) and non-boundary regions (1921) and (1923) that are outside the boundary region A.

Two neighboring reconstructed blocks of the reconstructed blocks (1911)-(1914) can include the blocks (1912) and (1914) separated by a second shared boundary (1942). The blocks (1912) and (1914) can include a boundary region B having samples on both sides of the second shared boundary (1942). Referring to FIGS. 19A-19B, the boundary region B can include sub-boundary regions B1 and B2 that are located in the blocks (1912) and (1914), respectively. The blocks (1912) and (1914) can include the boundary region B having samples on both sides of the shared boundary (1942) and non-boundary regions (1922) and (1924) that are outside the boundary region B.

Two neighboring reconstructed blocks of the reconstructed blocks (1911)-(1914) can include the blocks (1911) and (1912) separated by a shared boundary (1943). The blocks (1911) and (1912) can include a boundary region C having samples on both sides of the shared boundary (1943). Referring to FIGS. 19A-19B, the boundary region C can include sub-boundary regions C1 and C2 that are located in the blocks (1911) and (1912), respectively. The blocks (1911) and (1912) can include the boundary region C having samples on both sides of the shared boundary (1943) and non-boundary regions (1921) and (1922) that are outside the boundary region C.

Two neighboring reconstructed blocks of the reconstructed blocks (1911)-(1914) can include the blocks (1913) and (1914) separated by a shared boundary (1944). The blocks (1913) and (1914) can include a boundary region D having samples on both sides of the shared boundary (1944). Referring to FIGS. 19A-19B, the boundary region D can include sub-boundary regions D1 and D2 that are located in the blocks (1913) and (1914), respectively. The blocks (1913) and (1914) can include the boundary region D having samples on both sides of the shared boundary (1944) and non-boundary regions (1923) and (1924) that are outside the boundary region D.

Referring to FIG. 19A, the image (1901) can include the boundary regions A-D and non-boundary regions (1921)-(1924) that are outside the boundary regions A-D.

The sub-boundary regions A1-D1 and A2-D2 (and the boundary regions A-D) can have any suitable sizes (e.g., widths and/or heights). In an embodiment shown in FIG. 19A, the sub-boundary regions A1, A2, B1, and B2 have an identical size of m×n, where n is a width of the blocks (1911)-(1914), m is a height of the sub-boundary regions A1, A2, B1, and B2. Both m and n are positive integers. In an example, m is four pixels or four samples. Thus, the boundary regions A and B have an identical size of 2m×n. The sub-boundary regions C1, C2, D1, and D2 have an identical size of n×m, where n is a height of the blocks (1911)-(1914), m is a width of the sub-boundary regions C1, C2, D1, and D2. Thus, the boundary regions C and D have an identical size of n×2m. As described above, the sub-boundary regions and the boundary regions can have different sizes, such as different widths, different heights, and/or the like. For example, the sub-boundary regions A1 and A2 can have different heights. In an example, the sub-boundary regions C1 and C2 can have different widths. The boundary regions A and B can have different widths. The boundary regions C and D can have different heights.

In some examples, boundary regions have shapes that are different from rectangular shapes or square shapes. Boundary regions can have irregular shapes that are dependent on position(s), shape(s), and/or size(s) of neighboring blocks.

Referring to FIGS. 19A-19B, the boundary region A includes m lines of samples (e.g., m rows of samples) in the block (1911) from the first shared boundary (1941) and m lines of samples (e.g., m rows of samples) in the block (1913) from the first shared boundary (1941). The boundary region C includes m lines of samples (e.g., m columns of samples) in the block (1911) from the shared boundary (1943) and m lines of samples (e.g., m columns of samples) in the block (1912) from the shared boundary (1943).

Deblocking can be performed on one or more of the boundary regions A-D with a deblocking NN (1930), such as a deblocking NN based on DNN(s), CNN(s), or any suitable NN(s). In an example, the deblocking NN (1930) is implemented using a CNN including one or more convolutional layers. The deblocking NN (1930) can include additional layer(s) described in the disclosure, such as pooling layer(s), fully connected layer(s), normalization layer(s), and/or the like. The layers in the deblocking NN (1930) can be arranged in any suitable order and in any suitable architecture (e.g., a feed-forward architecture, a recurrent architecture). In an example, a convolutional layer is followed by other layer(s), such as pooling layer(s), fully connected layer(s), normalization layer(s), and/or the like.

Deblocking can be performed on the boundary regions A-D with the deblocking NN (1930). One or more of the boundary regions A-D include artifacts. The artifacts may be induced by respective adjacent blocks. The one or more of the boundary regions A-D can be sent to the deblocking NN (1930) to reduce the artifacts. Thus, an input to the deblocking NN (1930) includes the one or more of the boundary regions A-D, and an output from the deblocking NN (1930) includes one or more of the boundary regions A-D that are deblocked.

Referring to FIG. 19B, the boundary regions A-D include artifacts induced by respective adjacent blocks. The boundary regions A-D can be sent to the deblocking NN (1930) to reduce the artifacts. An output from the deblocking NN (1930) includes the deblocked boundary regions A'-D'. In an example, artifacts in the deblocked boundary regions A'-D' are reduced compared to the artifacts in the boundary regions A-D.

Referring to FIGS. 19B and 19C, the boundary regions A-D in the image (1901) are updated, for example by being replaced by the deblocked boundary regions A'-D'. Thus, an image (1950) (e.g., a deblocked image) is generated and includes the deblocked boundary regions A'-D' and the non-boundary regions (1921)-(1924).

In some examples, the image (1901) having the boundary regions A-D is treated as a single boundary region. The image (1901) is sent to the deblocking NN (1930) to reduce the blocking effect. An output from the deblocking NN (1930) includes a deblocked image (e.g., the image (1950)) where the deblocked image can include the deblocked boundary regions (e.g., A'-D') and the non-boundary regions (1921)-(1924).

In some examples, neighboring blocks including boundary region(s) (e.g., the blocks (1911)-(1912) including the boundary region C) are sent into the deblocking NN (1930). An output from the deblocking NN (1930) includes deblocked blocks where the deblocked blocks can include the deblocked boundary region (e.g., C') and the non-boundary regions (1921)-(1922).

One or more samples can be in multiple boundary regions. When multiple boundary regions are replaced by corresponding deblocked boundary regions, any suitable method can be used to determine a value of one of the one or more shared samples.

Referring to FIG. 19A, a sample S is in the boundary regions A and C. After obtaining the boundary regions A' and C', the following methods can be used to obtain a value of the sample S. In an example, the boundary region A is replaced by the deblocked boundary region A' and subsequently, the boundary region C is replaced by the deblocked boundary region C'. Thus, the value of the sample S is determined by a value of the sample S in the deblocked boundary region C'.

In an example, the boundary region C is replaced by the deblocked boundary region C' and subsequently, the boundary region A is replaced by the deblocked boundary region A'. Thus, the value of the sample S is determined by a value of the sample S in the deblocked boundary region A'.

In an example, the value of the sample S is determined by an average (e.g., a weighted average) of the value of the sample S in the deblocked boundary region A' and the value of the sample S in the deblocked boundary region C'.

Figure 20:
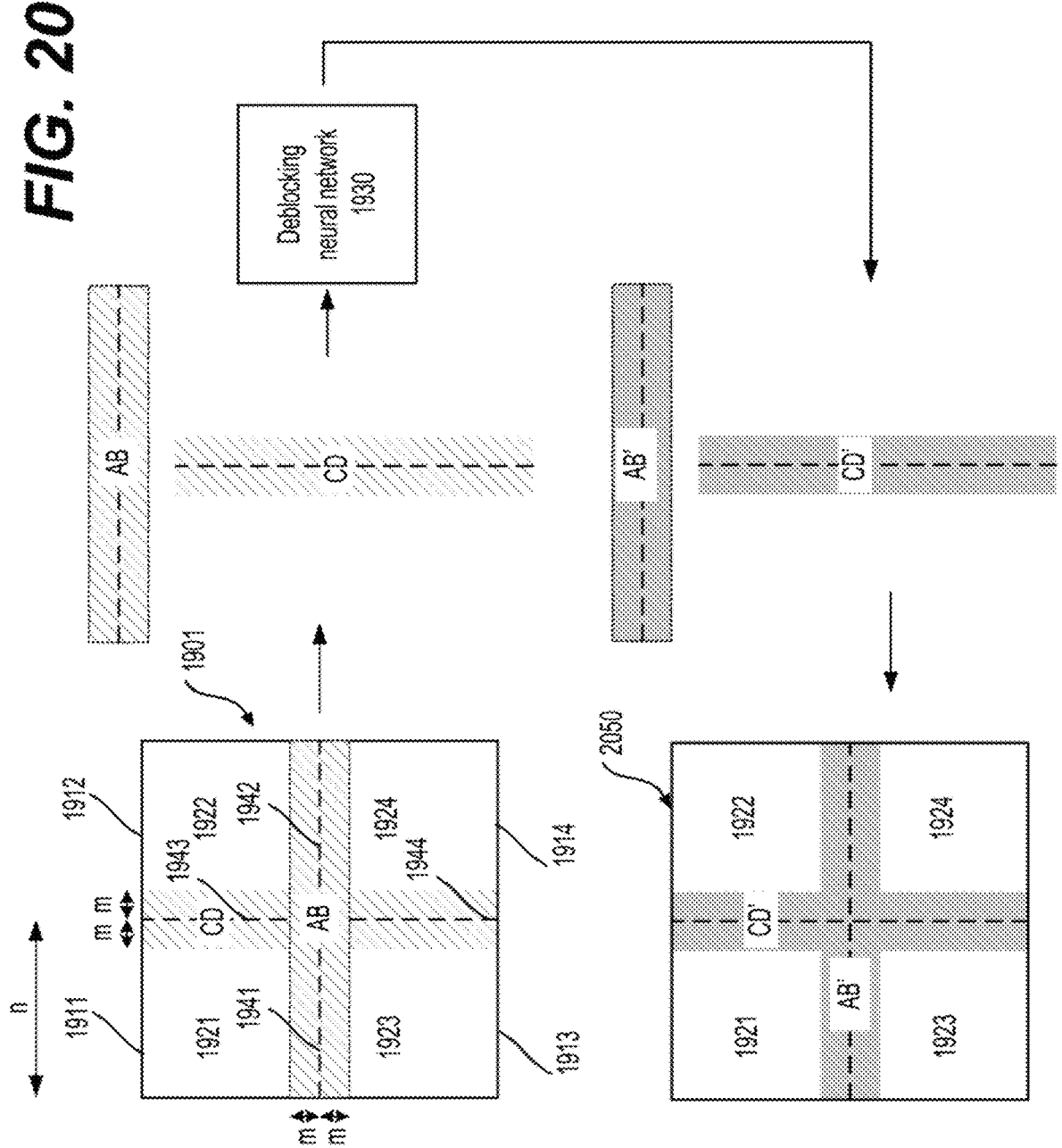
FIG. 20 shows an exemplary deblocking process according to embodiments of the disclosure.

A boundary region can include samples of more than two blocks. FIG. 20 shows an exemplary deblocking process where a boundary region can include samples of more than two blocks according to an embodiment of the disclosure. A single boundary region AB can include the boundary regions A and B. The boundary region AB can include samples on both sides of the shared boundary (1941) between the two neighboring reconstructed blocks (1911) and (1913), and include samples on both sides of the shared boundary (1942) between the two neighboring reconstructed blocks (1912) and (1914). A single boundary region CD can include the boundary regions C and D. The boundary region CD can include samples on both sides of the shared boundary (1943) between the two neighboring reconstructed blocks (1911) and (1912), and include samples on both sides of the shared boundary (1944) between the two neighboring reconstructed blocks (1913) and (1914).

A deblocking NN, such as the deblocking NN (1930), can perform deblocking on one or more of the boundary regions AB and CD to generate one or more deblocked ones of the boundary regions. Referring to FIG. 20, the boundary regions AB and CD are sent to the deblocking NN (1930) and deblocked boundary regions AB' and CD' are generated. The deblocked boundary regions AB' and CD' can replace the boundary regions AB and CD in the image (1901), and thus an image (2050) is generated. The image (2050) can include the deblocked boundary regions AB'-CD' and the non-boundary regions (1921)-(1924). The image (2050) can be identical to or different from the image (1950).

According to embodiments of the disclosure, a multi-model deblocking method can be used. Different deblocking models can be applied to different types or categories of boundary regions, to remove artifacts. A classification module can be applied to classify the boundary regions into different categories. Any classification module can be applied. In an example, the classification module is based on NN. In an example, the classification module is not based on NN. The boundary regions can be sent to different deblocking models according to the respective categories.

In an embodiment, the deblocking NN includes multiple deblocking NNs implemented based on different deblocking models, respectively. Which of the multiple deblocking NNs to apply to a boundary region can be determined, for example, by a classification module. Deblocking can be performed on the boundary region with the determined deblocking NN. In an example, which of the multiple deblocking NNs to apply is determined by a classification module that is based on a NN (e.g., a classification NN), such as a DNN, a CNN, or the like.

In an embodiment, the deblocking NN includes a single NN that implements the multi-model deblocking.

Figure 21:
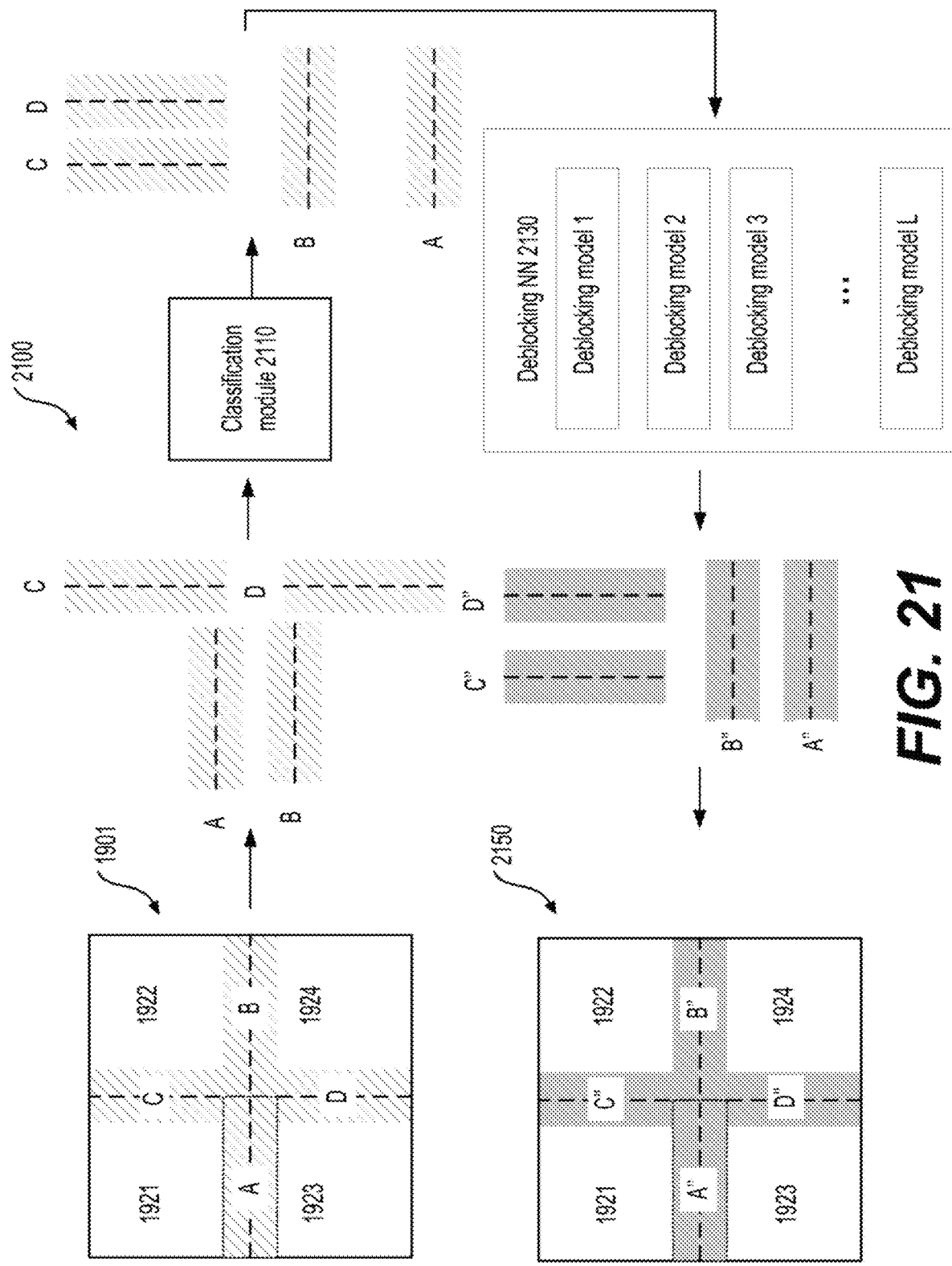
FIG. 21 shows an exemplary deblocking process based on multiple deblocking models according to an embodiment of the disclosure.

FIG. 21 shows an exemplary deblocking process (2100) based on multiple deblocking models according to an embodiment of the disclosure. A classification module (2110) can classify the boundary regions A-D into one or more categories. For example, the boundary regions C-D are classified into a first category, the boundary region B is classified into a second category, and the boundary region A is classified into a third category. Different deblocking models can be applied to boundary regions in different categories. In FIG. 21, a deblocking NN (2130) can be used to perform deblocking, such as a multi-model deblocking based on multiple deblocking models (e.g., deblocking models 1-L). L is a positive integer. When L is 1, the deblocking NN (2130) includes a single deblocking model. When L is larger than 1, the deblocking NN (2130) includes multiple deblocking models. The deblocking NN (2130) can be implemented using a single NN or multiple NNs.

In an example, the deblocking model 1 is applied to boundary region(s) (e.g., C and D) in the first category, and deblocked boundary region(s) (e.g., C'' and D'') are generated. The deblocking model 2 is applied to boundary region(s) (e.g., B) in the second category, and deblocked boundary region(s) (e.g., B'') are generated. The deblocking model 3 is applied to boundary region(s) (e.g., A) in the third category, and deblocked boundary region(s) (e.g., A'') are generated. The deblocked boundary regions A''-D'' can replace the corresponding boundary regions A-D in the image (1901), and thus an image (2150) is generated. The image (2150) can include the deblocked boundary regions A''-D'' and the non-boundary regions (2121)-(2124).

Any suitable metrics can be applied to classify or categorize a boundary region. In an example, a boundary region is classified according to content of the boundary region. For example, a boundary region with a high frequency content (e.g., content with a relatively large variance) and a boundary region with a low frequency content (e.g., content with a relatively small variance) are classified into different categories corresponding to different deblocking models. Strength of artifacts in a boundary region can be used to classify the boundary region. The multi-model deblocking method can be applied to any suitable boundary regions, such as the boundary regions (e.g., A, B, C, D, AB, and/or CD) between two or more blocks. A frequency of a boundary region may be determined based on a maximum difference of samples within the boundary region. In an example, a first difference of samples near a first edge in a first side of a shared boundary is determined. In an example, a second difference of samples near a second edge in a second side of the shared boundary is determined. In an example, the first difference and the second difference are determined.

A deblocking NN (e.g., the deblocking NN (1930) in FIG. 19B or the deblocking NN (2130) in FIG. 21) can be applied to remove artifacts among blocks. In an example, samples or pixels close to a shared boundary can be deblocked more than samples (or pixels) that are further away from the shared boundary. Referring back to FIG. 19A, the sample S is closer to the shared boundary (1941) than a sample F, and thus the sample S can be deblocked more than the sample F.

A deblocking model in a deblocking NN (e.g., the deblocking NN (1930) or the deblocking NN (2130)) can include one or more convolution layers. For example, a CNN-based attention mechanism (e.g., non-local attention, a Squeeze-and-Excitation Network (SENet)), a residual neural network (ResNet) (e.g., including a set of CNNs or convnets and an activation function), and/or the like may be used. For example, a DNN used by image super-resolution can be used, for example, by changing an output size to be identical to an input size. In image super-resolution, a resolution of an image can be enhanced from a low-resolution to a high-resolution.

How to perform deblocking on boundary region(s) with a NN or other learning-based methods is described above. In some examples, a video encoder and/or a video decoder may select between the deblocking method based on NN or a deblocking method not based on NN. The selection can be made on various levels, such as at a slice level, a picture level, for a group of pictures, a sequence level, and/or the like. The selection can be signaled using a flag. The selection can be inferred from content of a boundary region.

A video encoder and/or a video decoder may apply various level of boundary strength in addition to the methods and embodiments described in the disclosure, for example, when NN derived adjustments on pixels or samples are at a default level of a boundary strength (BS). By analyzing boundary conditions and block coding features, different levels of BS may be assigned to modify (e.g., enlarge or reduce) the default adjustment.

According to an embodiment of the disclosure, one or more of non-boundary regions of neighboring reconstructed blocks can be enhanced with an enhancement NN.

A deblocking NN (e.g., (1930) or (2130)) can be implemented using any suitable filtering methods that can reduce artifacts, such as artifacts caused by blocking effect, and improve visual quality. The deblocking NN (e.g., (1930) or (2130)) can include any neural network architecture (e.g., a feed-forward architecture or a recurrent architecture), can include any number and any suitable combination of layers, can include one or more sub-neural networks, can include any suitable types of parameters (e.g., weights, biases, a combination of weights and biases), and can include any suitable number of parameters, as described in the disclosure. In an example, the deblocking NN (e.g., (1930) or (2130)) is implemented using DNN(s) and/or CNN(s).

In an example, the deblocking NN is implemented using a CNN including one or more convolutional layers. The deblocking NN can include additional layer(s) described in the disclosure, such as pooling layer(s), fully connected layer(s), normalization layer(s), and/or the like. The layers in the deblocking NN can be arranged in any suitable order and in any suitable architecture (e.g., a feed-forward architecture or a recurrent architecture). In an example, a convolutional layer is followed by other layer(s), such as pooling layer(s), fully connected layer(s), normalization layer(s), and/or the like. Each of the convolutional layers in the deblocking NN can include any suitable number of channels and any suitable convolution kernels and strides.

The deblocking NN can be trained based on any suitable training images or training blocks. The training of the deblocking NN can be similar or identical to those described above with reference to FIG. 9B. In an embodiment, the training images can include reconstructed images having artifacts due to a blocking effect. In an embodiment, the training blocks can include reconstructed blocks having artifacts due to a blocking effect. In an embodiment, the deblocking NN (e.g., (1930) or (2130)) is trained with boundary regions having artifacts due to a blocking effect (e.g., the boundary regions A-D, AB, and/or CD) in respective training blocks or training images. The deblocking NN (e.g., (1930) or (2130)) can be configured with trained parameters after the training process. The trained deblocking NN can perform deblocking on one or more boundary regions, such as shown in FIGS. 19A-19C, 20, 21, 22A, and 22B. The deblocking NN (e.g., (1930) or (2130)) can be applied to a reconstructed image (e.g., the image (1901)) or reconstructed blocks (e.g., the blocks (1911)-(1912)) to reduce blocking effect, such as described with reference to FIGS. 19B-19C. The deblocking NN (e.g., (1930) or (2130)) can be applied to boundary regions, as shown below in FIGS. 22A-22B.

The deblocking NN (e.g., (1930) or (2130)) can be trained separately to determine parameters in the deblocking NN. The deblocking NN (e.g., (1930) or (2130)) can be trained as a component in a NIC framework or trained together with a NIC framework. For example, the NIC framework (900) and the deblocking NN (e.g., (1930) or (2130)) can be trained jointly.

In the descriptions below, for purposes of brevity, a boundary signal can refer to a reconstructed image including boundary region(s), neighboring reconstructed blocks including boundary region(s), or boundary region(s) in a reconstructed image or neighboring reconstructed blocks. The boundary signal can have artifacts due to a blocking effect. In an embodiment, the boundary signal has not been deblocked by the deblocking NN. The boundary signal can correspond to an encoded signal.

Referring to FIGS. 9B, 19A, and 19B, the boundary signal can be based on output(s) (e.g., the reconstructed blocks) from the main decoder network (915). The encoded signal corresponding to the boundary signal can be based on output(s) (e.g., the encoded blocks) from the entropy encoder (913).

In an example, the boundary signal includes a reconstructed image including boundary region(s), such as the image (1901) including reconstructed blocks (e.g., the blocks (1911)-(1914)) from the main decoder network (915) where the image (1901) includes the boundary regions A-D. The encoded signal corresponding to the reconstructed image can include an encoded image based on outputs (e.g., the encoded blocks) from the entropy encoder (913).

In an example, the boundary signal includes a boundary region (e.g., the boundary region A, B, C, D, AB, or CD) in a reconstructed image (e.g., the image (1901)). The encoded signal corresponding to the boundary region can include an encoded image based on outputs (e.g., the encoded blocks) from the entropy encoder (913).

In an example, the boundary signal includes neighboring reconstructed blocks including boundary region(s), such as the blocks (1911)-(1912)) from the main decoder network (915). The encoded signal corresponding to the neighboring reconstructed blocks can include encoded blocks (e.g., neighboring encoded blocks) based on outputs from the entropy encoder (913).

In an example, the boundary signal includes a boundary region (e.g., the boundary region A, B, C, D, AB, or CD) in neighboring reconstructed blocks that are output from the main decoder network (915). The encoded signal corresponding to the boundary region can include encoded blocks (e.g., neighboring encoded blocks) based on outputs from the entropy encoder (913).

Deblocking can be applied to a boundary signal (e.g., a boundary region in a reconstructed image or reconstructed blocks, a reconstructed image, or neighboring reconstructed blocks) to determine a deblocked boundary signal (e.g., a deblocked boundary region, a deblocked image, or deblocked neighboring reconstructed blocks). Deblocking can be used to reduce a R-D loss L of the deblocked boundary signal where the R-D loss L can include a distortion loss D of the deblocked boundary signal and a rate loss R of an encoded signal corresponding to the boundary signal. In an embodiment, the rate loss R of the encoded signal remains unchanged in the deblocking process because the encoded signal (e.g., an encoded image including the encoded block 931 or encoded blocks including the encoded block 931 in FIG. 9B) is not affected by the deblocking process. Thus, the R-D loss L of the deblocked boundary signal can be indicated by the distortion loss D of the deblocked boundary signal that is dependent on the deblocking process. Deblocking can be applied to reduce the distortion loss D of the deblocked boundary signal, for example, the distortion loss D of the deblocked boundary signal can be less than a distortion loss D of the corresponding boundary signal.

An example of deblocking is shown with reference to FIGS. 9A, 9B, and 19A-19C. An input image to be coded or compressed can be partitioned into blocks (e.g., input blocks), as described with reference to FIG. 9A. Referring to FIG. 9B, each of the input blocks (e.g., the input block x) can be processed by the NIC framework (900) to generate the corresponding encoded block $\hat{x}$ and the reconstructed block $\bar{x}$, respectively.

In an example, the boundary signal to be deblocked is the reconstructed image including the reconstructed blocks $\bar{x}$. Symbols I, $\hat{I}$, and $\bar{I}$ are used to denote the input image, the encoded image that includes the encoded blocks, and the reconstructed image that includes the reconstructed blocks, respectively. Referring to FIGS. 19A-19C, in an example, the reconstructed image $\bar{I}$ (e.g., the image (1901)) is fed into the deblocking NN (e.g., (1930)) to obtain the deblocked image $\tilde{I}$ (e.g., the image (1950)). According to an embodiment of the disclosure, deblocking can be implemented to reduce the R-D loss L (I, $\bar{I}$, $\hat{I}$) shown in Eq. 9.

$$L(I,\bar{I},\hat{I}) = \lambda D(I,\bar{I}) + R(\hat{I})$$ Eq. 9 where the R-D loss L (I, $\bar{I}$, $\hat{I}$) corresponding to the deblocked image $\bar{I}$ can include the distortion loss D (I, $\bar{I}$) of the deblocked image $\bar{I}$ and the rate loss R ($\hat{I}$) of the encoded image $\hat{I}$.

As described above, the rate loss R ($\hat{I}$) of the encoded image $\hat{I}$ remains unchanged in the deblocking process. Thus, the performance of the deblocking NN can be determined based on the distortion loss D(I, $\bar{I}$) of the deblocked image $\bar{I}$. In an example, the distortion loss D (I, $\bar{I}$) of the reconstructed image $\bar{I}$ is reduced to the distortion loss D (I, $\bar{I}$) of the deblocked image $\bar{I}$ where the distortion loss D(I, $\bar{I}$) is less than the distortion loss D(I, $\bar{I}$).

The above description can be adapted if the boundary signal to be deblocked includes (i) neighboring reconstructed blocks (e.g., (1911)-(1912)) or (ii) a boundary region (e.g., the boundary region A).

A boundary signal to be deblocked by the deblocking NN can correspond to an input signal (e.g., an input image or input blocks) to be encoded and optionally to be included in a coded video bitstream. A deblocked boundary signal can be generated by the deblocking NN based on the boundary signal. If the boundary signal to be deblocked is significantly different from the training images, the training blocks, and/or the training boundary regions that are used to train the deblocking NN, the deblocked boundary signal can correspond to a relatively poor R-D loss L or a relatively large distortion D. Therefore, aspects of the disclosure describe a content-adaptive online training method and an apparatus for deblocking, for example, used in block-wise image compression. In the content-adaptive online training for deblocking, one or more parameters (e.g., weight(s) and/or bias(es)) of the deblocking NN can be determined based on a boundary signal where the boundary signal is generated based on the input signal (e.g., the input image or the input blocks) to be compressed (e.g., encoded) and/or to be included in the coded video bitstream. The input signal can include raw data or residue data. For purposes of brevity, the content-adaptive online training for deblocking that is based on the boundary signal to be deblocked is denoted as deblocking training in the disclosure.

According to an embodiment of the disclosure, deblocking information indicating the one or more determined parameters (e.g., the determined weight(s) and/or the determined bias(es)) of the deblocking NN can be encoded and optionally included in the coded video bitstream. Thus, a R-D loss $L_p$ can include a rate loss or a bit consumption R(p) of signaling the deblocking information in the coded video bitstream. In an example, the boundary signal is the reconstructed image $\bar{I}$, and $L_p$ can be determined as shown in Eq. 10

$$L_p(I,\bar{I},\hat{I}) = \lambda D(I,\bar{I}) + R(\hat{I}) + R(p)$$ Eq. 10 where the R-D loss $L_p$ (I, $\bar{I}$, $\hat{I}$) corresponding to the deblocked boundary signal $\bar{I}$ can include the distortion loss D (I, $\bar{I}$) of the deblocked boundary signal $\bar{I}$ (e.g., the deblocked reconstructed image), the rate loss R ($\hat{I}$) of the encoded signal $\hat{I}$ (e.g., the encoded image), and the rate loss R(p). As described above, the rate loss R ($\hat{I}$) remains unchanged in the deblocking process, and thus the rate loss R ($\hat{I}$) remains unchanged in the deblocking training. The addition of the rate loss R(p) to Eq. 10 increases the R-D loss $L_p$ (I, $\bar{I}$, $\hat{I}$) as compared to the R-D loss L (I, $\bar{I}$, $\hat{I}$) shown in Eq. 9. A sum of $\lambda$D (I, $\bar{I}$) and R(p) is denoted as $L_{training}$. The deblocking training can be implemented to decrease the distortion loss D (I, $\bar{I}$) of the deblocked boundary signal $\bar{I}$ such that the term $L_{training}$ is less than $\lambda$D (I, $\bar{I}$) despite the increase of the rate loss R(p). In an example, the deblocking training can decrease (e.g., minimize) the term $L_{training}$ such that the term $L_{training}$ is less than $\lambda D$ (I, Ĩ) of the corresponding reconstructed signal without the deblocking process. In an example, the deblocking training can decrease (e.g., minimize) the term $L_{training}$ such that the term $L_{training}$ is less than $\lambda D$ of a deblocked boundary signal that is generated using the deblocking NN without the deblocking training.

According to embodiments of the disclosure, at an encoder side, an input image to be compressed or coded can be partitioned into blocks. Referring to FIG. 9B, the blocks can be encoded into encoded blocks, for example, based on the NIC framework (900). The encoded blocks can be processed by the NIC framework (900) to generate reconstructed blocks.

A deblocking training can be implemented, for example, at the encoder side, based on a boundary signal that is associated with the reconstructed blocks (e.g., neighboring reconstructed blocks in the reconstructed blocks). In an example, the neighboring reconstructed blocks include a subset of the reconstructed blocks in the reconstructed image. In an example, the neighboring reconstructed blocks include each of the reconstructed blocks in the reconstructed image, and thus the entire reconstructed image is treated as the neighboring reconstructed blocks. Accordingly, the boundary signal can include (i) the entire reconstructed image, such as the image (1901), (ii) the neighboring reconstructed blocks, such as the blocks (1911)-(1912), or (iii) one or more boundary regions (e.g., one or more of the boundary regions A-D) that are included in the reconstructed blocks.

According to an embodiment of the disclosure, the boundary signal includes the entire reconstructed image. The deblocking training can be implemented based on the reconstructed image where the one or more parameters of the deblocking NN are determined (e.g., updated) by optimizing rate-distortion performance, for example, based on an iterative update process such as described above with reference to FIG. 9B. In the deblocking training process, the term $L_{training}$ can be reduced by iteratively updating the one or more parameters of the deblocking NN.

Figure 22A:
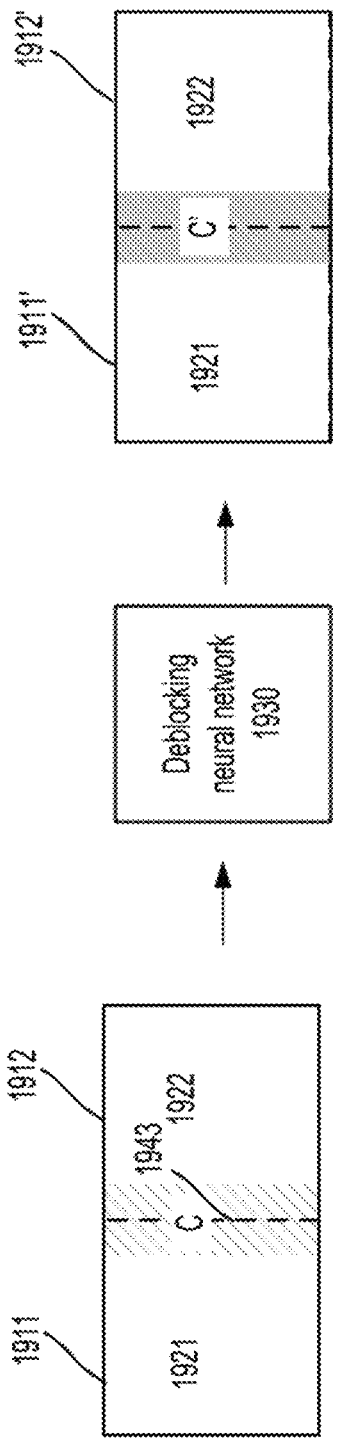
FIG. 22A-22B show exemplary deblocking processes according to embodiments of the disclosure.

In an example, the boundary signal includes the neighboring reconstructed blocks, such as the blocks (1911)-(1912). FIG. 22A shows an exemplary deblocking process according to an embodiment of the disclosure. The neighboring reconstructed blocks (1911)-(1912) are fed into the deblocking NN (e.g., (1930)), and deblocked blocks (1911)'-(1912)' are generated where the deblocked blocks (1911)'-(1912)' include the deblocked boundary region C' and the non-boundary regions (1921)-(1922). In an example, the distortion loss of the reconstructed blocks (1911)-(1912) is reduced to the distortion loss of the deblocked blocks (1911)'-(1912)'. According to an embodiment of the disclosure, the deblocking training can be implemented based on the neighboring reconstructed blocks where the one or more parameters of the deblocking NN are determined (e.g., updated) by optimizing rate-distortion performance, for example, based on an iterative update process such as described above with reference to FIG. 9B. In the deblocking training process, the term $L_{training}$ can be reduced by iteratively updating the one or more parameters of the deblocking NN.

Figure 22B:

In an example, the boundary signal includes one or more boundary regions, such as one or more of the boundary regions A-D shown in FIG. 19A or one or more of the boundary regions AB and CD shown in FIG. 20. FIG. 22B shows an exemplary deblocking process according to an embodiment of the disclosure. The boundary region A in the neighboring reconstructed blocks (1911) and (1913) is fed into the deblocking NN (e.g., (1930)) to obtain the deblocked boundary region A'. In an example, the distortion loss D of the boundary region A is reduced to the distortion loss D of the deblocked boundary region A'. According to an embodiment of the disclosure, the deblocking training can be implemented based on the one or more boundary regions where the one or more parameters of the deblocking NN are determined (e.g., updated) by optimizing rate-distortion performance, for example, based on an iterative update process such as described above with reference to FIG. 9B. In the deblocking training process, the term $L_{training}$ can be reduced by iteratively updating the one or more parameters of the deblocking NN.

According to an embodiment of the disclosure, the boundary signal includes a boundary region (e.g., A) in neighboring reconstructed blocks (e.g., (1911) and (1913)) in a reconstructed image (e.g., (1901)). At an encoder side, the deblocking information indicating the determined one or more parameters of the deblocking NN can be encoded into a video bitstream along with corresponding encoded blocks. The deblocking information can correspond to the boundary signal (e.g., the boundary region) that is used to determine the deblocking information in the deblocking training. For purposes of brevity, examples and/or embodiments below are given using boundary region(s) as boundary signal(s) unless otherwise noted. The descriptions can be suitably adapted if the boundary signal(s) include reconstructed image(s) or reconstructed blocks.

At a decoder side, the encoded blocks can be reconstructed from the coded video bitstream. The reconstructed blocks can include the neighboring reconstructed blocks (e.g., (1911) and (1913)). The deblocking information in the coded video bitstream corresponding to the boundary region can be decoded where the deblocking information can indicate the one or more parameters of the deblocking NN in a video decoder. The deblocking NN in the video decoder can be determined based on the determined one or more parameters indicated by the deblocking information. In an example, the deblocking NN is specifically determined for the boundary region. The boundary region can be deblocked based on the determined deblocking NN corresponding to the boundary region.

As the one or more parameters in the deblocking NN are determined based on the boundary signal (e.g., the boundary region) to be deblocked, the deblocking NN can be dependent on the boundary signal (e.g., the boundary region). As the boundary signal is determined based on the input image or blocks to be coded, the deblocking NN is content-adaptive to the input image or the blocks to be coded. As the deblocking training can be performed based on the boundary signal to be coded, the deblocking training can be online training. As the deblocking training is dependent on the boundary signal, and thus can be tailored to the boundary signal, better compression performance can be achieved by using the deblocking NN determined using the deblocking training.

The NN-based deblocking (e.g., DNN-based deblocking or CNN-based deblocking) can be implemented in an NN-based image coding framework (e.g., the NIC framework (900)), or other image compression methods. The deblocking training can be used as a preprocessing step (e.g., a pre-encoding step) for boosting the compression performance of any image compression method.

The deblocking training can be agnostic to an image compression codec, and can be implemented with any suitable type of image compression codec. The image compression codec can be NN-based, such as the NIC framework (900) shown in FIG. 9B. The image compression codec can be implemented without a NN, such as in certain implementations of FIGS. 5-8.

The one or more parameters can include a bias term, a weight coefficient, and/or the like in the deblocking NN.

In an embodiment, the deblocking NN is not configured with initial parameters, and the deblocking training is implemented to generate parameters of the deblocking NN (e.g., including the one or more parameter of the deblocking NN).

In an embodiment, the deblocking NN is configured with initial parameters (e.g., initial weights and/or initial biases), for example, prior to the deblocking training. In an embodiment, the deblocking NN is pretrained based on a training dataset including training blocks, training images, and/or training boundary regions. The initial parameters can include pretrained parameters (e.g., pretrained weights and/or pretrained biases). In an embodiment, the deblocking NN is not pretrained. The initial parameters can include random initialized parameters.

In an embodiment, one or more initial parameters of the initial parameters in the deblocking NN are iteratively updated in the deblocking training based on the boundary signal. The one or more initial parameters can be updated based on the one or more parameters (e.g., one or more replacement parameters) determined in the deblocking training. For example, the one or more initial parameters are replaced by the one or more replacement parameters, respectively. In some examples, the one or more parameters indicated by the deblocking information are decompressed and then used to update the deblocking NN.

In an example, an entire set of the initial parameters is updated by the one or more replacement parameters. In an example, a subset of the initial parameters is updated by the one or more replacement parameters and a remaining subset of the initial parameters remains unchanged by the deblocking training.

By using the determined one or more parameters (e.g., the one or more replacement parameters) in the deblocking NN, the deblocking NN can be applied to the boundary signal to be deblocked and achieve a better distortion performance, such as a smaller R-D loss $L_p$. As described with reference to Eq. 10, R(p) represents the bit consumption of the deblocking information the determined one or more parameters (e.g., the one or more replacement parameters) encoded into the video bitstream.

According to an embodiment of the disclosure, one or more other boundary regions (e.g., the boundary region B in the reconstructed blocks (1912) and (1914)) can be deblocked based on the determined deblocking NN corresponding to the boundary region (e.g., the boundary region A). For example, when the boundary region (e.g., A) and the one or more other boundary regions (e.g., B) have similar pixel distributions, the same deblocking NN can be applied to deblock the boundary region (e.g., A) and the one or more other boundary regions (e.g., B) and achieve relatively large coding efficiency.

The above descriptions can be suitably adapted when multiple boundary signals, such as multiple boundary regions (e.g., the boundary regions A-B) are used to determine the one or more parameters in the deblocking NN where the determined one or more parameters are shared by the multiple boundary signals.

According to an embodiment of the disclosure, the deblocking training can be referred to as a finetuning process where the one or more initial parameters (e.g., the one or more pretrained parameters) of the initial parameters in the deblocking NN can be updated (e.g., finetuned) based on boundary signal(s) that are determined based on input image(s) to be encoded and optionally included in a video bitstream or input blocks of an input image to be encoded and optionally included in a video bitstream. The boundary signal(s) can be different from the training images, the training blocks, or the training boundary regions used to obtain the pretrained parameters. Thus, the deblocking NN can be adapted to target the content of the input image(s) or the input blocks.

In an example, the boundary signal includes a single boundary region (e.g., the boundary region A), and the deblocking training is performed with the single boundary region. The deblocking NN is determined (e.g., trained or updated) based on the single boundary region. The determined deblocking NN on a decoder side can be used to deblock the boundary region and optionally other boundary regions. The deblocking information can be encoded into the video bitstream together with the encoded blocks that correspond to the reconstructed blocks including the boundary region.

In an embodiment, the boundary signal includes multiple boundary regions (e.g., the boundary regions A-B), and the deblocking training is performed with the multiple boundary regions. The deblocking NN is determined (e.g., trained or updated) based on the multiple boundary regions. The determined deblocking NN on a decoder side can be used to deblock the multiple boundary regions and optionally other boundary regions. The deblocking information can be encoded into the video bitstream together with the encoded blocks that correspond to the reconstructed blocks including the multiple boundary regions.

The rate loss R(p) can increase with the signaling of the deblocking information in the video bitstream. When the boundary signal includes the single boundary region, the deblocking information may be signaled for each boundary region, and a first increase to the rate loss R(p) is used to indicate the increase to the rate loss R(p) due to the signaling of the deblocking information per boundary region. When the boundary signal includes the multiple boundary regions, the deblocking information may be signaled for the multiple boundary regions and may be shared by the multiple boundary regions, and a second increase to the rate loss R(p) is used to indicate the increase to the rate loss R(p) due to the signaling of the deblocking information per boundary region. Because the deblocking information is shared by the multiple boundary regions, the second increase to the rate loss R(p) can be less than the first increase to the rate loss R(p). Thus, in some examples, it can be advantageous to determine (e.g., train or update) the deblocking NN using the multiple boundary regions.

In an embodiment, a subset of parameters of the deblocking NN is determined in the deblocking training. For example, a subset of the initial parameters in the deblocking NN is updated in the deblocking training. In an embodiment, each parameter of the deblocking NN is determined in the deblocking training. For example, each initial parameter in the deblocking NN is updated in the deblocking training. In an example, the entire set of the initial parameters is replaced by the determined one or more parameters.

In an embodiment, the one or more initial parameters that are updated are in a single layer (e.g., a single convolutional layer) of the deblocking NN. In an embodiment, the one or more initial parameters that are updated are in multiple or all layers (e.g., multiple or all convolutional layers) of the deblocking NN.

The deblocking NN can be specified by different types of parameters, such as weights, biases, and the like. The deblocking NN can be configured with suitable initial parameters, such as weights, biases, or a combination of weights and biases. When CNN(s) are used, the weights can include elements in convolution kernels.

In an embodiment, the one or more initial parameters to be updated are bias term(s), and only the bias term(s) are replaced by the determined one or more parameters. In an embodiment, the one or more initial parameters to be updated are weights, and only the weights are replaced by the determined one or more parameters. In an embodiment, the one or more initial parameters to be updated include the weights and bias term(s) and are replaced by the determined one or more parameters.

In an embodiment, different types of parameters (e.g., biases or weights) can be determined (e.g., updated) for different boundary signals (e.g., boundary regions). For example, a first boundary region is used to update a first type of parameters (e.g., at least one bias) in the deblocking NN corresponding to the first boundary region, and a second boundary region is used to update a second type of parameters (e.g., at least one weight) in the deblocking NN corresponding to the second boundary region.

In an embodiment, different parameters are updated for different boundary signals (e.g., different boundary regions).

In an embodiment, multiple boundary signals (e.g., multiple boundary regions) share the same one or more parameters. In an example, all the boundary regions in a reconstructed image share the same one or more parameters.

In an embodiment, the one or more initial parameters to be updated are chosen based on a characteristic of a boundary signal (e.g., a boundary region), such as a RGB variance of the boundary region. In an embodiment, the one or more initial parameters to be updated are chosen based on a RD performance of the boundary region.

At the end of the deblocking training, one or more updated parameters can be computed for the respective determined one or more parameters (e.g., the respective one or more replacement parameters). The deblocking information can indicate the one or more updated parameters, and thus can indicate the determined one or more parameters by indicating the one or more updated parameters. In some embodiments, the one or more updated parameters can be encoded into the video bitstream as the deblocking information. In an embodiment, the one or more updated parameters are calculated as differences between the determined one or more parameters (e.g., the respective one or more replacement parameters) and the corresponding one or more initial parameters (e.g., the one or more pretrained parameters). For example, the deblocking information indicates the differences between the one or more parameters and the respective one or more of the initial parameters. The one or more parameters can be determined according to a sum of the differences and the respective one or more of the initial parameters.

In an embodiment, the one or more updated parameters are the determined one or more parameters, respectively.

In an embodiment, how to obtain the one or more updated parameters from the respective determined one or more parameters depends on the boundary signal (e.g., the boundary region) used in the deblocking training. Different methods can be used for different boundary regions. In an example, an updated parameter for a deblocking NN applied to a first boundary region is calculated as a difference between a replacement parameter obtained based on the first boundary region and a corresponding initial parameter. In an example, an updated parameter for a deblocking NN applied to a second boundary region is a replacement parameter obtained based on the second boundary region.

In an embodiment, different boundary signals (e.g., different boundary regions) have different relationships between the one or more updated parameters and the determined one or more parameters. For example, for a first boundary region, the one or more updated parameters are calculated as differences between the one or more replacement parameters and the corresponding one or more pretrained parameters. For a second boundary region, the one or more updated parameters are the one or more replacement parameters, respectively.

In an embodiment, how to obtain the one or more updated parameters from the respective determined one or more parameters does not depend on the boundary signal (e.g., the boundary region) used in the deblocking training. In an example, all boundary regions share the same way to update parameter(s) in the deblocking NN. In an embodiment, multiple boundary regions (e.g., all boundary regions) in an image have a same relationship between the one or more updated parameters and the one or more replacement parameters.

In an embodiment, the relationship between the one or more updated parameters and the one or more replacement parameters is chosen based on characteristics of a boundary signal (e.g., a boundary region), such as a RGB variance of the boundary region. In an embodiment, the relationship between the one or more updated parameters and the one or more replacement parameters is chosen based on a RD performance of the boundary region.

In an embodiment, the one or more updated parameters can be generated from the determined one or more parameters (e.g., the one or more replacement parameters), for example, using a certain linear or nonlinear transform, and the one or more updated parameters are representative parameter(s) generated based on the determined one or more parameters. The determined one or more parameters are transformed into the one or more updated parameters for better compression.

The one or more updated parameters can be compressed or not compressed. In an example, the one or more updated parameters are compressed, for example, using LZMA2 that is a variation of a Lempel-Ziv-Markov chain algorithm (LZMA), a bzip2 algorithm, or the like. In an example, compression is omitted for the one or more updated parameters.

In an embodiment, compression methods for the one or more updated parameters are different for different boundary signals (e.g., different boundary regions). For example, for a first boundary region, the LZMA2 is used to compress the one or more updated parameters, and for a second boundary region, the bzip2 is used to compress the one or more updated parameters. In an embodiment, a same compression method is used to compress the one or more updated parameters for multiple boundary regions (e.g., all boundary regions) in an image or in reconstructed blocks. In an embodiment, a compression method is chosen based on characteristics of a boundary signal (e.g., a boundary region), such as a RGB variance of the boundary region. In an embodiment, a compression method is chosen based on RD performance of the boundary region.

The deblocking training can include multiple epochs (e.g., iterations) where the one or more initial parameters are updated in an iterative process. The deblocking training can stop when a training loss has flattened or is about to flatten. In an example, the deblocking training stops when the training loss (e.g., the R-D loss $L_p$ or the term $L_{training}$) is below a first threshold. In an example, the deblocking training stops when a difference between two successive training losses is below a second threshold.

Two hyperparameters (e.g., a step size and a maximum number of steps) can be used in the deblocking training together with a loss function (e.g., the R-D loss $L_p$ or the term $L_{training}$). The maximum number of iterations can be used as a threshold of a maximum number of iterations to terminate the deblocking training. In an example, the deblocking training stops when a number of iterations reaches the maximum number of iterations.

The step size can indicate a learning rate of the online training process (e.g., the deblocking training). The step size can be used in a gradient descent algorithm or a backpropagation calculation performed in the deblocking training. A step size can be determined using any suitable method.

In the deblocking training, the step size for each boundary signal (e.g., each boundary region) can be different. In an embodiment, different step sizes can be assigned for boundary regions in an image in order to achieve a better compression result (e.g., a better R-D loss $L_p$ or a better term $L_{training}$).

In an embodiment, different step sizes are used for boundary signals (e.g., boundary regions) with different types of contents to achieve optimal results. Different types can refer to different variances. In an example, the step size is determined based on a variance of a boundary region used to update the deblocking NN. For example, a step size of a boundary region having a high variance is larger than a step size of a boundary region having a low variance where the high variance is larger than the low variance.

In an embodiment, a step size is chosen based on characteristics of a boundary signal (e.g., a boundary region), such as RGB variance of the boundary region. In an embodiment, a step size is chosen based on RD performance (e.g., a R-D loss $L_p$ or a term $L_{training}$) of the boundary region. Multiple sets of parameter(s) (e.g., multiple sets of replacement parameter(s)) can be generated based on different step sizes, and the set with the better compression performance (e.g., a smaller R-D loss $L_p$ or a smaller term $L_{training}$) can be chosen.

In an embodiment, a first step size can be used to run a certain number (e.g., 100) of iterations. Then, a second step size (e.g., the first step size plus or minus a size increment) can be used to run the certain number of iterations. Results from the first step size and the second step size can be compared to determine a step size to be used. More than two step sizes may be tested to determine an optimal step size.

A step size can vary during the deblocking training. The step size can have an initial value at an onset of the deblocking training, and the initial value can be reduced (e.g., halved) at a later stage of the deblocking training, for example, after a certain number of iterations to achieve a finer tuning. The step size or the learning rate can be varied by a scheduler during the iterative deblocking training. The scheduler can include a parameter adjustment method used to adjust the step size. The scheduler can determine a value for the step size such that the step size can increase, decrease, or remain constant in a number of intervals. In an example, the learning rate is altered in each step by the scheduler. A single scheduler or multiple different schedulers can be used for different boundary signals (e.g., different boundary regions). Thus, multiple sets of parameter(s) can be generated based on the multiple schedulers, and one of the multiple sets of parameter(s) with the better compression performance (e.g., a smaller R-D loss $L_p$ or a smaller term $L_{training}$) can be chosen.

In an embodiment, multiple learning rate schedules are assigned for different boundary signals (e.g., different boundary regions) in order to achieve better compression result. In an example, all boundary regions in an image share a same learning rate schedule. In an example, a set of boundary regions share a same learning rate schedule. In an embodiment, selection of learning rate schedules is based on characteristics of a boundary region, such as a RGB variance of the boundary region. In an embodiment, selection of learning rate schedules is based on the RD performance of the boundary region.

In an embodiment, a structure (e.g., an architecture) of the deblocking NN for each boundary signal (e.g., each boundary regions) is identical. The structure of the deblocking NN can include a number of layers, how different nodes and/or layers are organized and connected, a feed-forward architecture, a recurrent architecture, a DNN, a CNN, and/or the like. In an example, the structure refers to a number of convolution layers, and different blocks have the same number of convolution layers.

In an embodiment, different structures of the deblocking NN correspond to different boundary signals (e.g., different boundary regions). In an example, the deblocking NN has different numbers of convolution layers correspond to different boundary regions.

In an embodiment, whether to use the deblocking NN to deblock a boundary signal (e.g., a boundary region) is determined based on (i) a comparison of the R-D loss $L_p$ with the deblocking training and the R-D loss L without the deblocking training or (ii) a comparison of the term $L_{training}$ with the deblocking training and the weighted distortion loss $\lambda D$ without the deblocking training. In an embodiment, a deblocking NN with the best R-D performance (e.g., the smallest R-D loss $L_p$) is chosen based on a comparison of different R-D loss $L_{ps}$ of different deblocking NNs.

According to an embodiment of the disclosure, each boundary signal (e.g., each boundary region) corresponds to a deblocking NN that is determined in the deblocking training based on the boundary region. A deblocking NN can be updated independently from another deblocking NN. For example, the deblocking NN corresponding to a first boundary region is updated independently from the deblocking NN corresponding to a second boundary region.

According to an embodiment of the disclosure, the deblocking NN corresponding to a boundary signal (e.g., a boundary region) can be updated based on the deblocking NN corresponding to another boundary signal (e.g., another boundary region). In an example, first deblocking information in a coded bitstream corresponding to the first boundary region is decoded. The first deblocking information can indicate a first parameter of the deblocking NN in the video decoder. The deblocking NN in the video decoder corresponding to the first boundary region can be determined based on the first parameter indicated by the first deblocking information. The first boundary region can be deblocked based on the determined deblocking NN corresponding to the first boundary region.

Second neighboring reconstructed blocks can have a second shared boundary and include a second boundary region of samples on both sides of the second shared boundary. Parameter(s) in the deblocking NN corresponding to the first boundary region can be used to update the deblocking NN corresponding to the second boundary region. For example, pixel distributions in boundary regions of a same image can be similar, and thus parameter(s) to be updated of the deblocking NN corresponding to different boundary signals (e.g., different boundary regions) may be reduced. Second deblocking information in the coded bitstream corresponding to the second boundary region can be decoded. The second deblocking information can indicate a second parameter. The second boundary region is different from the first boundary region. The deblocking NN can be updated based on the first parameter and the second parameter. the updated deblocking NN corresponds to the second boundary region and is configured with the first parameter and the second parameter. The second boundary region can be deblocked based on the updated deblocking NN corresponding to the second boundary region.

In an embodiment, different deblocking NNs can be applied to boundary signals (e.g., boundary regions) having different sizes. In general, a number of parameters in a deblocking NN can increase with a size (e.g., a width, a height, or an area) of a boundary region.

In an embodiment, different deblocking NNs are applied to a same boundary signal (e.g., a same boundary region) corresponding to different compression quality targets.

The NIC framework and the deblocking NN can include any type of neural networks and use any neural network-based image compression methods, such as a context-hyperprior encoder-decoder framework, a scale-hyperprior encoder-decoder framework, a Gaussian Mixture Likelihoods framework and variants of the Gaussian Mixture Likelihoods framework, an RNN-based recursive compression method and variants of the RNN-based recursive compression method, and the like.

The deblocking training methods and apparatus in the disclosure can have the following benefits. Adaptive online training mechanisms are exploited to improve the coding efficiency. Use of a flexible and general framework can accommodate various types of pretrained frameworks and quality metrics. For example, certain initial parameters (e.g., pretrained parameters) in the deblocking NN can be replaced by using online training with boundary signal(s) that are based on block(s) or image(s) to be encoded.

Figure 23:
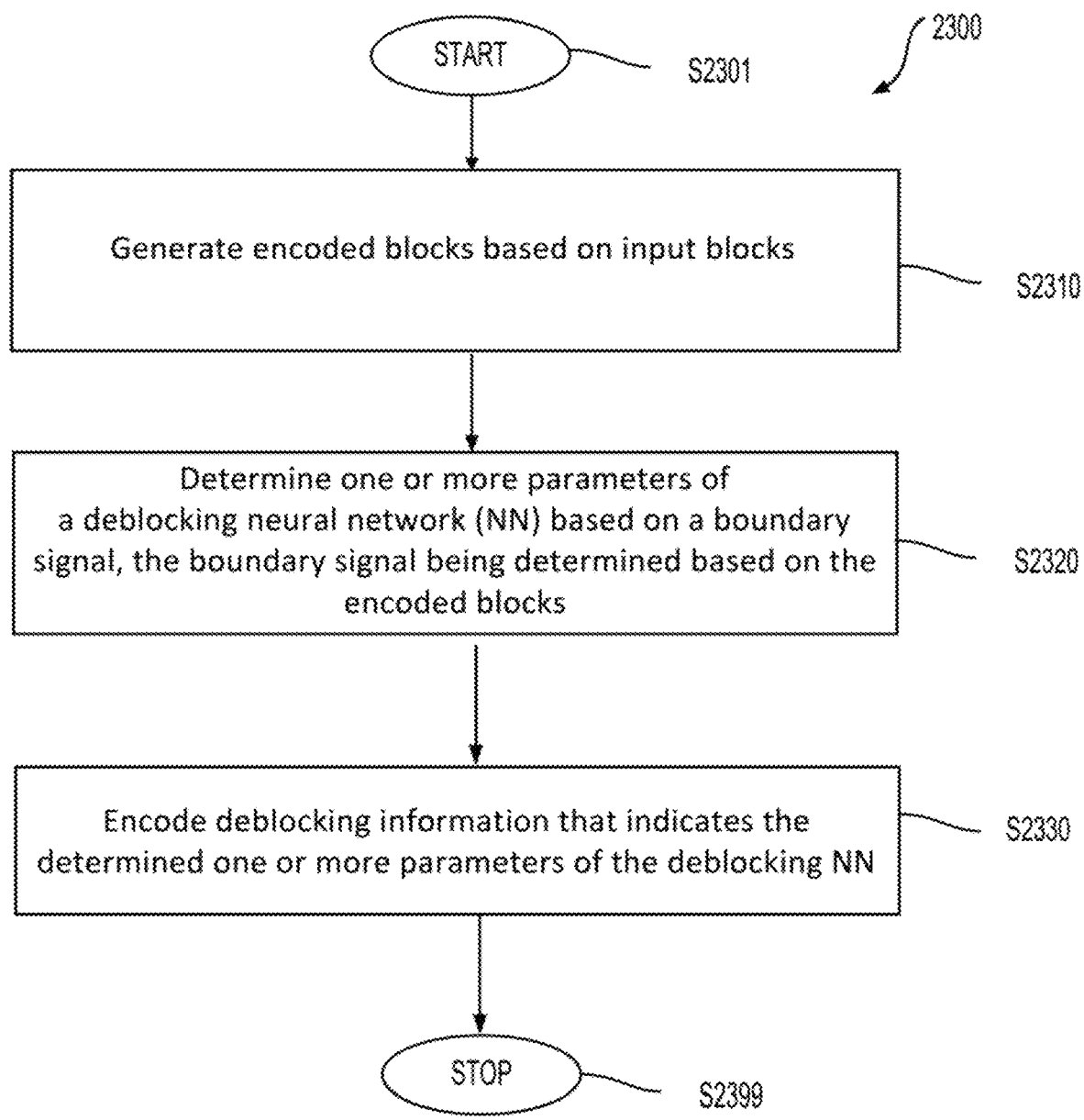
FIG. 23 shows a flow chart outlining an encoding process according to an embodiment of the disclosure.

FIG. 23 shows a flow chart outlining an encoding process (2300) according to an embodiment of the disclosure. The process (2300) can be used in encoding input blocks, deblocking training, and/or encoding deblocking information. In various embodiments, the process (2300) is executed by processing circuitry, such as the processing circuitry in the terminal devices (310), (320), (330) and (340), processing circuitry that performs functions of a video encoder (e.g., (403), (603), (703), (1600A), or (1700)), or the like. In an example, the processing circuitry performs a combination of functions, such as (i) one of the video encoder (403), the video encoder (603), and the video encoder (703) and (ii) one of the video encoder (1600A) or the video encoder (1700). In some embodiments, the process (2300) is implemented in software instructions, thus when the processing circuitry executes the software instructions, the processing circuitry performs the process (2300). The process starts at (S2301), and proceeds to (S2310).

At (S2310), encoded blocks (e.g., $\hat{x}$) can be generated based on input blocks (e.g., x) in an input image using any suitable method. In an example, the encoded blocks $\hat{x}$ are generated based on the input blocks x as described with reference to FIG. 9B. In an example, the input blocks include a subset of blocks in the input image. In an example, the input blocks include an entire set of blocks in the input image.

At (S2320), reconstructed blocks can be generated based on the encoded blocks $\hat{x}$. Referring to FIG. 9B, in an example, the reconstructed blocks (e.g., $\bar{x}$) are generated based on the encoded blocks $\hat{x}$ using the NIC framework (900). The deblocking training can be implemented to determine one or more parameters of a deblocking NN based on a boundary signal. The boundary signal can be based on the reconstructed blocks, as described in the disclosure. In an example, the boundary signal includes a boundary region in the reconstructed blocks.

The deblocking NN can be configured with initial parameters, and one or more initial parameters of the initial parameters can be iteratively updated in the deblocking training. The one or more initial parameters can be replaced by the one or more parameters.

At (S2330), deblocking information indicating the determined one or more parameters of the deblocking NN can be encoded. The deblocking information corresponds to the boundary signal (e.g., the boundary region). In some examples, the encoded blocks $\hat{x}$ and the deblocking information can be included and optionally transmitted in the coded video bitstream. The process (2300) proceeds to (S2399), and terminates.

The process (2300) can be suitably adapted to various scenarios and steps in the process (2300) can be adjusted accordingly. One or more of the steps in the process (2300) can be adapted, omitted, repeated, and/or combined. Any suitable order can be used to implement the process (2300). Additional step(s) can be added. In an example, the boundary signal includes the reconstructed blocks, and the one or more parameters can be generated based on the reconstructed blocks. In an example, the boundary signal includes each reconstructed block in a reconstructed image, and the one or more parameters can be generated based on the reconstructed image.

Figure 24:
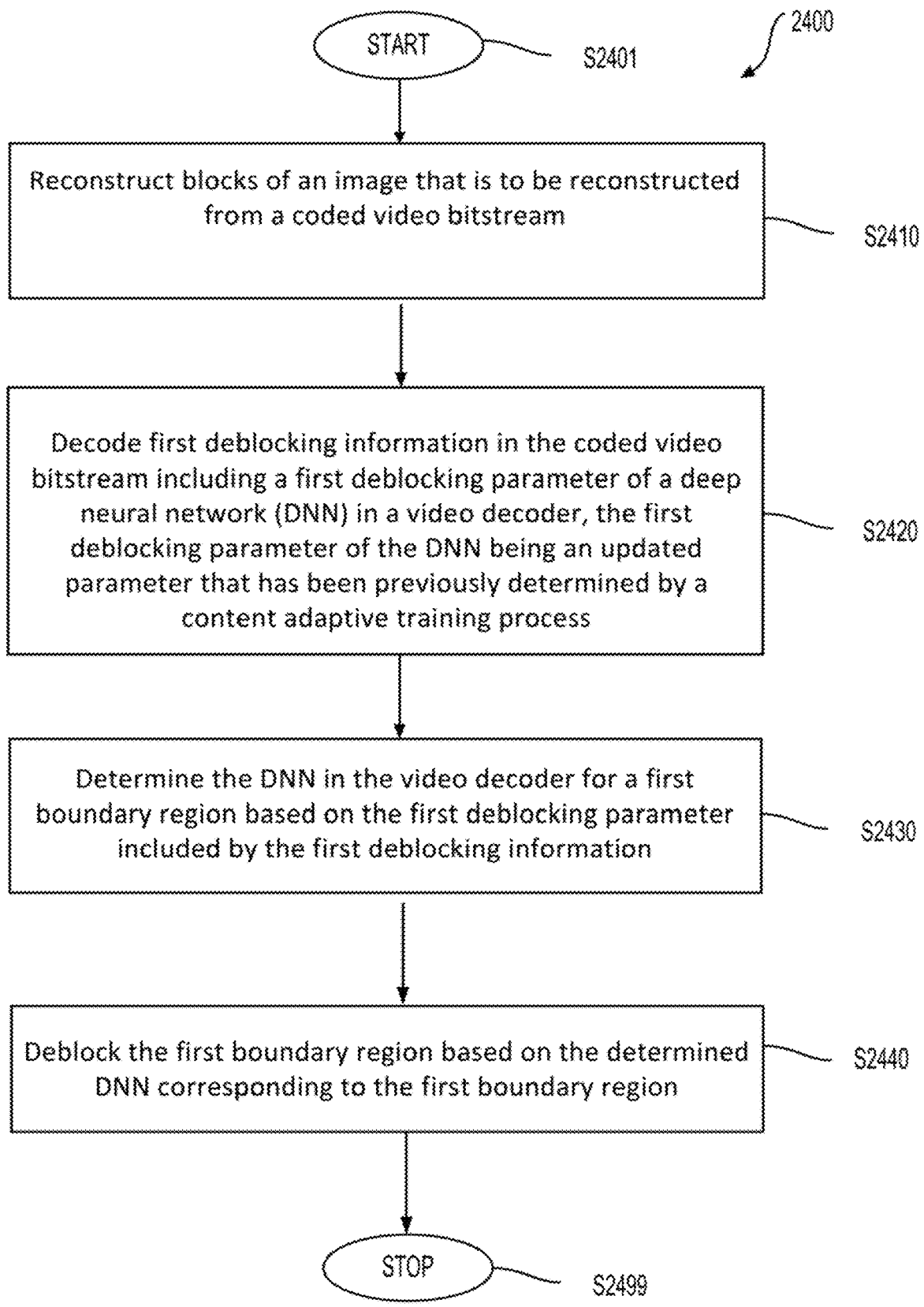
FIG. 24 shows a flow chart outlining a decoding process according to an embodiment of the disclosure.

FIG. 24 shows a flow chart outlining a decoding process (2400) according to an embodiment of the disclosure. The process (2400) can be used in the reconstruction and deblocking of a boundary signal (e.g., a boundary region) based on deblocking information in a video bitstream. In various embodiments, the process (2400) is executed by processing circuitry, such as the processing circuitry in the terminal devices (310), (320), (330) and (340), the processing circuitry that performs functions of the video decoder (1600B), and the processing circuitry that performs functions of a video decoder including a deblocking NN. In an example, the processing circuitry performs a combination of functions including deblocking. In some embodiments, the process (2400) is implemented in software instructions, thus when the processing circuitry executes the software instructions, the processing circuitry performs the process (2400). The process starts at (S2401), and proceeds to (S2410).

At (S2410), blocks of an image that is to be reconstructed from a coded video bitstream can be reconstructed. The reconstructed blocks can include first neighboring reconstructed blocks that have a first shared boundary and include a first boundary region of samples on both sides of the first shared boundary.

At (S2420), first deblocking information in the coded video bitstream can be decoded. In an example, the first deblocking information corresponds to the first boundary region. The first deblocking information can indicate a first parameter (or a first deblocking parameter) of a deblocking neural network (NN) (e.g., a deep NN or DNN) in the video decoder. The first deblocking parameter of the DNN is an updated parameter that has been previously determined (e.g., trained) by a content adaptive training process. For example, The first deblocking parameter is determined by an online training process. In an example, the first deblocking information can include the first deblocking parameter.

The first parameter can be a bias term or a weight coefficient in the deblocking NN.

The first deblocking information can indicate one or more parameters of the deblocking NN in various manners. In an example, the deblocking NN is configured with initial parameters. The first deblocking information indicates a difference between the first parameter and the one of the initial parameters, and the first parameter can be determined according to a sum of the difference and the one of the initial parameters. In another example, the first pos-filtering information indicates the one or more parameters directly.

In an example, a number of layers in the deblocking NN is dependent on a size (e.g., a width, a height, or an area) of the first boundary region.

In an example, the first boundary region further includes samples on both sides of a third shared boundary between third two neighboring reconstructed blocks of the reconstructed blocks, and the first two neighboring reconstructed blocks are different from the third two neighboring reconstructed blocks.

At (S2430), the deblocking NN in the video decoder for the first boundary region can be determined based on the first parameter indicated by the first deblocking information.

In an example, the deblocking NN is configured with initial parameters, and one of the initial parameters is updated based on the first parameter. For example, the one of the initial parameters is replaced with the first parameter.

At (S2440), the first boundary region can be deblocked based on the determined deblocking NN corresponding to the first boundary region.

In an example, the first neighboring reconstructed blocks further include non-boundary regions that are outside the first boundary region, and the first boundary region in the first neighboring reconstructed blocks is replaced with the deblocked first boundary region.

In an example, second neighboring reconstructed blocks of the reconstructed blocks have a second shared boundary and include a second boundary region having samples on both sides of the second shared boundary. The second boundary region can be deblocked based on the determined deblocking NN corresponding to the first boundary region.

The process (2400) proceeds to (S2499), and terminates.

The process (2400) can be suitably adapted to various scenarios and steps in the process (2400) can be adjusted accordingly. One or more of the steps in the process (2400) can be adapted, omitted, repeated, and/or combined. Any suitable order can be used to implement the process (2400). Additional step(s) can be added.

In an example, second neighboring reconstructed blocks of the reconstructed blocks have a second shared boundary and include a second boundary region of samples on both sides of the second shared boundary. Second deblocking information in the coded bitstream corresponding to the second boundary region can be decoded. The second deblocking information can indicate a second parameter. The second boundary region can be different from the first boundary region. The deblocking NN can be updated based on the first parameter and the second parameter. The updated deblocking NN corresponds to the second boundary region and is configured with at least the first parameter and the second parameter. The second boundary region can be deblocked based on the updated deblocking NN corresponding to the second boundary region.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

This disclosure does not put any restrictions on methods used for an encoder such as a NN-based encoder, a decoder such as a NN-based decoder. Neural network(s) used in an encoder, a decoder, and/or the like can be any suitable types of neural network(s), such as a DNN, a CNN, and the like.

Thus, the content-adaptive online training methods of this disclosure can accommodate different types of NIC frameworks, e.g., different types of encoding DNNs, decoding DNNs, encoding CNNs, decoding CNNs, and/or the like.

The techniques described above, can be implemented as computer software using computer-readable instructions and physically stored in one or more computer-readable media. For example, FIG. 25 shows a computer system (2500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 25:
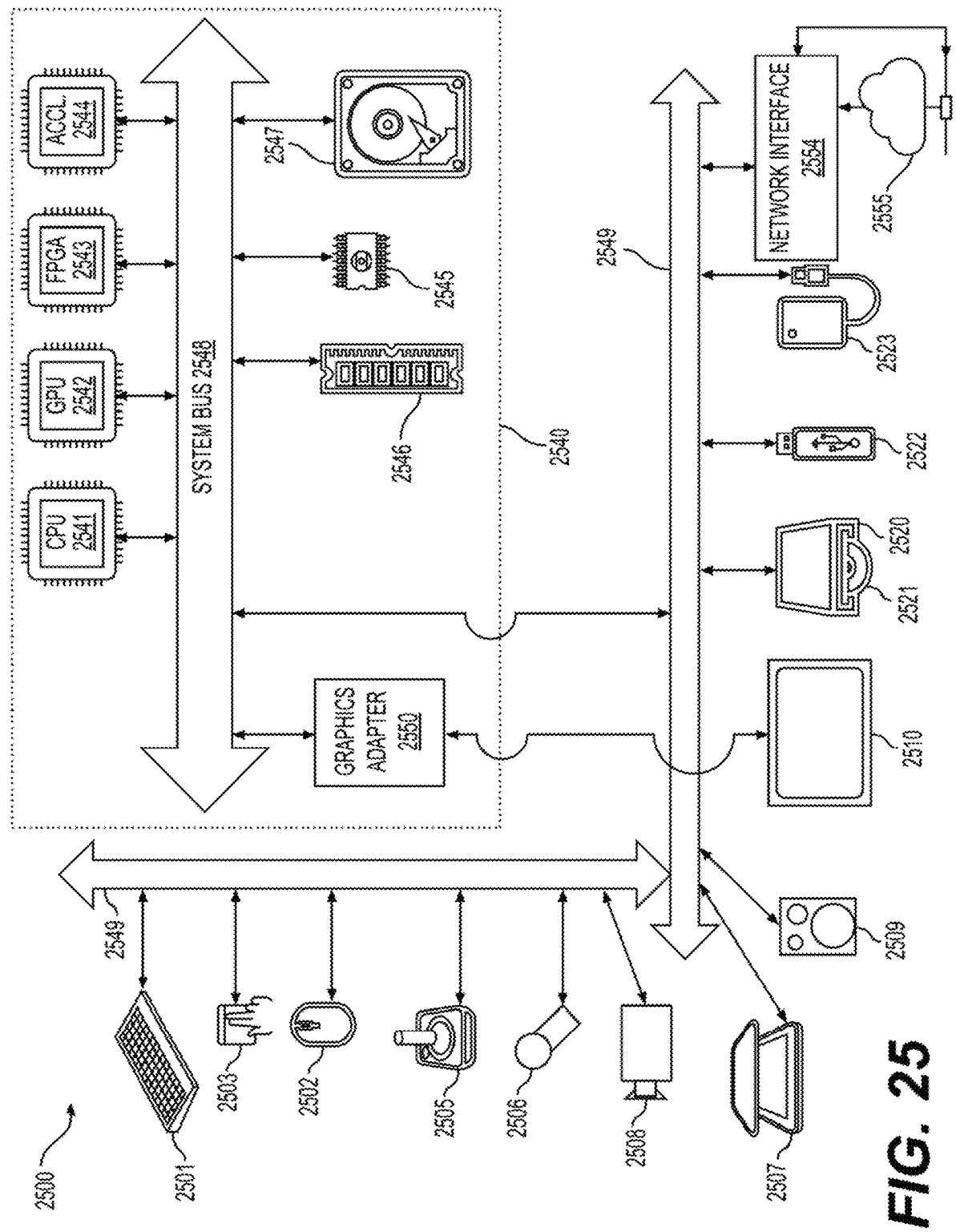
FIG. 25 is a schematic illustration of a computer system in accordance with an embodiment.

The components shown in FIG. 25 for computer system (2500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2500).

Computer system (2500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2501), mouse (2502), trackpad (2503), touch screen (2510), data-glove (not shown), joystick (2505), microphone (2506), scanner (2507), camera (2508).

Computer system (2500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2510), data-glove (not shown), or joystick (2505), but there can also be tactile feedback devices that do not serve as input devices), audio output devices (such as: speakers (2509), headphones (not depicted)), visual output devices (such as screens (2510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2500) can also include human accessible storage devices and their associated media such as optical media including CD/DVD ROM/RW (2520) with CD/DVD or the like media (2521), thumb-drive (2522), removable hard drive or solid state drive (2523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2500) can also include an interface (2554) to one or more communication networks (2555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2549) (such as, for example USB ports of the computer system (2500)); others are commonly integrated into the core of the computer system (2500) by attachment to a system bus as described below (for example Ethernet interface into a PC computer system or cellular network interface into a smartphone computer system). Using any of these networks, computer system (2500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2540) of the computer system (2500).

The core (2540) can include one or more Central Processing Units (CPU) (2541), Graphics Processing Units (GPU) (2542), specialized programmable processing units in the form of Field Programmable Gate Areas (FPGA) (2543), hardware accelerators for certain tasks (2544), graphics adapters (2550), and so forth. These devices, along with Read-only memory (ROM) (2545), Random-access memory (2546), internal mass storage such as internal non-user accessible hard drives, SSDs, and the like (2547), may be connected through a system bus (2548). In some computer systems, the system bus (2548) can be accessible in the form of one or more physical plugs to enable extensions by additional CPUs, GPU, and the like. The peripheral devices can be attached either directly to the core's system bus (2548), or through a peripheral bus (2549). In an example, the screen (2510) can be connected to the graphics adapter (2550). Architectures for a peripheral bus include PCI, USB, and the like.

CPUs (2541), GPUs (2542), FPGAs (2543), and accelerators (2544) can execute certain instructions that, in combination, can make up the aforementioned computer code. That computer code can be stored in ROM (2545) or RAM (2546). Transitional data can be also be stored in RAM (2546), whereas permanent data can be stored for example, in the internal mass storage (2547). Fast storage and retrieve to any of the memory devices can be enabled through the use of cache memory, that can be closely associated with one or more CPU (2541), GPU (2542), mass storage (2547), ROM (2545), RAM (2546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2500), and specifically the core (2540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2540) that are of non-transitory nature, such as core-internal mass storage (2547) or ROM (2545). The software implementing various embodiments of the present disclosure can be stored in such devices and executed by core (2540). A computer-readable medium can include one or more memory devices or chips, according to particular needs. The software can cause the core (2540) and specifically the processors therein (including CPU, GPU, FPGA, and the like) to execute particular processes or particular parts of particular processes described herein, including defining data structures stored in RAM (2546) and modifying such data structures according to the processes defined by the software. In addition or as an alternative, the computer system can provide functionality as a result of logic hardwired or otherwise embodied in a circuit (for example: accelerator (2544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units, PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
NIC: Neural Image Compression
R-D: Rate-Distortion
E2E: End to End
ANN: Artificial Neural Network
DNN: Deep Neural Network
CNN: Convolution Neural Network While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
    reconstructing blocks of an image that is to be reconstructed from a coded video bitstream;
    decoding first deblocking information in the coded video bitstream including a first deblocking parameter of a deep neural network (DNN) in the video decoder, wherein the first deblocking parameter of the DNN is an updated parameter that has been previously determined by a content adaptive training process;
    determining the DNN in the video decoder for a first boundary region comprising a subset of samples in the reconstructed blocks based on the first deblocking parameter included in the first deblocking information; and
    deblocking the first boundary region comprising the subset of samples in the reconstructed blocks based on the determined DNN corresponding to the first deblocking parameter.

2. The method of claim 1, wherein
the reconstructed blocks include first neighboring reconstructed blocks that have a first shared boundary and include the first boundary region of samples on both sides of the first shared boundary;
the first neighboring reconstructed blocks further include non-boundary regions that are outside the first boundary region; and
the first boundary region in the first neighboring reconstructed blocks is replaced with the deblocked first boundary region.

3. The method of claim 2, wherein
the reconstructed blocks include second neighboring reconstructed blocks that have a second shared boundary and include a second boundary region of samples on both sides of the second shared boundary; and
the method further includes:
    decoding second deblocking information in the coded video bitstream corresponding to the second boundary region, the second deblocking information indicating a second deblocking parameter that has been previously determined by a content adaptive training process, the second boundary region being different from the first boundary region;
    updating the DNN based on the first deblocking parameter and the second deblocking parameter, the updated DNN corresponding to the second boundary region and being configured with the first deblocking parameter and the second deblocking parameter; and
    deblocking the second boundary region based on the updated DNN corresponding to the second boundary region.

4. The method of claim 2, wherein
the reconstructed blocks include second neighboring reconstructed blocks of the reconstructed blocks that have a second shared boundary and include a second boundary region having samples on both sides of the second shared boundary; and
the method further includes deblocking the second boundary region based on the determined DNN corresponding to the first boundary region.

5. The method of claim 2, wherein
the first boundary region further includes samples on both sides of a third shared boundary between third two neighboring reconstructed blocks included in the reconstructed blocks, and
the first two neighboring reconstructed blocks are different from the third two neighboring reconstructed blocks.

6. The method of claim 1, wherein the first deblocking parameter is a bias term or a weight coefficient in the DNN.

7. The method of claim 1, wherein
the DNN is configured with initial parameters, and
the determining the DNN includes updating one of the initial parameters based on the first deblocking parameter.

8. The method of claim 7, wherein
the first deblocking information indicates a difference between the first deblocking parameter and the one of the initial parameters, and
the method further includes determining the first deblocking parameter according to a sum of the difference and the one of the initial parameters.

9. The method of claim 1, wherein a number of layers of the DNN is dependent on a size of the first boundary region.

10. An apparatus for video decoding, comprising:
processing circuitry configured to:
    reconstruct blocks of an image that is to be reconstructed from a coded video bitstream;
    decode first deblocking information in the coded video bitstream including a first deblocking parameter of a deep neural network (DNN) in the video decoder, wherein the first deblocking parameter of the DNN is an updated parameter that has been previously determined by a content adaptive training process;

determine the DNN in the video decoder for a first boundary region comprising a subset of samples in the reconstructed blocks based on the first deblocking parameter included in the first deblocking information; and deblock the first boundary region comprising the subset of samples in the reconstructed blocks based on the determined DNN corresponding to the first deblocking parameter.

11. The apparatus of claim 10, wherein the reconstructed blocks include first neighboring reconstructed blocks that have a first shared boundary and include the first boundary region of samples on both sides of the first shared boundary;

the first neighboring reconstructed blocks further include non-boundary regions that are outside the first boundary region; and the first boundary region in the first neighboring reconstructed blocks is replaced with the deblocked first boundary region.

12. The apparatus of claim 11, wherein the reconstructed blocks include second neighboring reconstructed blocks that have a second shared boundary and include a second boundary region of samples on both sides of the second shared boundary; and the processing circuitry is configured to:

decode second deblocking information in the coded video bitstream corresponding to the second boundary region, the second deblocking information indicating a second deblocking parameter that has been previously determined by a content adaptive training process, the second boundary region being different from the first boundary region;

update the DNN based on the first deblocking parameter and the second deblocking parameter, the updated DNN corresponding to the second boundary region and being configured with the first deblocking parameter and the second deblocking parameter; and deblock the second boundary region based on the updated DNN corresponding to the second boundary region.

13. The apparatus of claim 11, wherein the reconstructed blocks include second neighboring reconstructed blocks of the reconstructed blocks that have a second shared boundary and include a second boundary region having samples on both sides of the second shared boundary; and the processing circuitry is configured to deblock the second boundary region based on the determined DNN corresponding to the first boundary region.

14. The apparatus of claim 11, wherein the first boundary region further includes samples on both sides of a third shared boundary between third two neighboring reconstructed blocks included in the reconstructed blocks, and the first two neighboring reconstructed blocks are different from the third two neighboring reconstructed blocks.

15. The apparatus of claim 10, wherein the first deblocking parameter is a bias term or a weight coefficient in the DNN.

16. The apparatus of claim 10, wherein the DNN is configured with initial parameters, and the processing circuitry is configured to update one of the initial parameters based on the first deblocking parameter.

17. The apparatus of claim 16, wherein the first deblocking information indicates a difference between the first deblocking parameter and the one of the initial parameters, and the processing circuitry is configured to determine the first deblocking parameter according to a sum of the difference and the one of the initial parameters.

18. The apparatus of claim 10, wherein a number of layers of the DNN is dependent on a size of the first boundary region.

19. A non-transitory computer-readable storage medium storing a program executable by at least one processor to perform:

reconstructing blocks of an image that is to be reconstructed from a coded video bitstream;

decoding first deblocking information in the coded video bitstream including a first deblocking parameter of a deep neural network (DNN) in the video decoder, wherein the first deblocking parameter of the DNN is an updated parameter that has been previously determined by a content adaptive training process;

determining the DNN in the video decoder for a first boundary region comprising a subset of samples in the reconstructed blocks based on the first deblocking parameter included in the first deblocking information; and deblocking the first boundary region comprising the subset of samples in the reconstructed blocks based on the determined DNN corresponding to the first deblocking parameter.

20. The non-transitory computer-readable storage medium of claim 19, wherein the reconstructed blocks include first neighboring reconstructed blocks that have a first shared boundary and include the first boundary region of samples on both sides of the first shared boundary;

the first neighboring reconstructed blocks further include non-boundary regions that are outside the first boundary region; and the first boundary region in the first neighboring reconstructed blocks is replaced with the deblocked first boundary region.

* * * * *